United States Patent
Wessells et al.

(10) Patent No.: US 9,853,318 B2
(45) Date of Patent: *Dec. 26, 2017

(54) STABILIZATION OF BATTERY ELECTRODES USING POLYMER COATINGS

(71) Applicant: Alveo Energy, Inc., Palo Alto, CA (US)

(72) Inventors: Colin Deane Wessells, Palo Alto, CA (US); Robert Alan Huggins, Stanford, CA (US)

(73) Assignee: Natron Energy, Inc., Santa Clara, CA (US)

( * ) Notice: Subject to any disclaimer, the term of this patent is extended or adjusted under 35 U.S.C. 154(b) by 1017 days.

This patent is subject to a terminal disclaimer.

(21) Appl. No.: 13/892,982

(22) Filed: May 13, 2013

(65) Prior Publication Data

US 2014/0127592 A1    May 8, 2014

Related U.S. Application Data

(60) Provisional application No. 61/722,049, filed on Nov. 2, 2012.

(51) Int. Cl.
*H01M 4/62* (2006.01)
*H01M 4/04* (2006.01)
(Continued)

(52) U.S. Cl.
CPC ............ *H01M 10/02* (2013.01); *C25D 17/10* (2013.01); *H01M 4/0404* (2013.01);
(Continued)

(58) Field of Classification Search
CPC .......... H01M 4/366; H01M 4/38; H01M 4/58; H01M 4/622; H01M 4/5825;
(Continued)

(56) References Cited

U.S. PATENT DOCUMENTS 5,654,114 A * 8/1997 Kubota ................. H01M 4/485
429/231.3
5,869,207 A    2/1999 Saidi et al.
(Continued)

FOREIGN PATENT DOCUMENTS

CN    102522553 A    6/2012
EP       86555 A1    8/1983
(Continued)

OTHER PUBLICATIONS

Asakura, D., et al. Fabrication of a Cyanide-Bridged Coordination Polymer Electrode for Enhanced Electrochemical Ion Storage Ability. J. Phys. Chem. C, 116, 8364 (2012).
(Continued)

*Primary Examiner* — Osei Amponsah
(74) *Attorney, Agent, or Firm* — Patent Law Offices Michael E. Woods; Michael E. Woods

(57) ABSTRACT

An electrochemical device (e.g., a battery (cell)) including: an aqueous electrolyte and one or two electrodes (e.g., an anode and/or a cathode), one or both of which is a Prussian Blue analogue material of the general chemical formula $A_xP[R(CN)_{6-j}L_j]_z \cdot nH_2O$, where: A is a cation; P is a metal cation; R is a transition metal cation; L is a ligand that may be substituted in the place of a $CN^-$ ligand; $0 \le x \le 2$; $0 \le z \le 1$; and $0 \le n \le 5$, the electrode including a polymer coating to reduce capacity loss.

16 Claims, 19 Drawing Sheets

(51) Int. Cl.
　　　H01M 4/58　　　(2010.01)
　　　H01M 10/02　　(2006.01)
　　　H01M 10/04　　(2006.01)
　　　H01M 4/36　　　(2006.01)
　　　H01M 10/36　　(2010.01)
　　　C25D 17/10　　(2006.01)
　　　H01M 4/38　　　(2006.01)

(52) U.S. Cl.
　　　CPC ......... *H01M 4/0452* (2013.01); *H01M 4/366* (2013.01); *H01M 4/58* (2013.01); *H01M 4/5825* (2013.01); *H01M 4/628* (2013.01); *H01M 10/04* (2013.01); *H01M 10/36* (2013.01); *H01M 4/38* (2013.01); *H01M 4/622* (2013.01); *H01M 2300/0005* (2013.01); *Y10T 29/49108* (2015.01); *Y10T 29/49115* (2015.01)

(58) Field of Classification Search
　　　CPC .. H01M 4/0404; H01M 4/628; H01M 4/0452; H01M 10/36; H01M 10/02; H01M 10/04; H01M 2300/0005
　　　USPC ........................................ 429/347, 188, 199
　　　See application file for complete search history.

(56) References Cited

U.S. PATENT DOCUMENTS

| | | | |
|---|---|---|---|
| 6,924,061 | B1 | 8/2005 | Jow et al. |
| 7,318,982 | B2 * | 1/2008 | Gozdz .................... H01M 4/13 428/403 |
| 7,585,590 | B2 * | 9/2009 | Wang ................ H01M 10/0525 429/199 |
| 8,308,971 | B1 | 11/2012 | Bhat et al. |
| 9,123,966 | B2 | 9/2015 | Wessells et al. |
| 9,130,234 | B2 | 9/2015 | Wessells et al. |
| 9,287,589 | B2 | 3/2016 | Wessells et al. |
| 2007/0117007 | A1 | 5/2007 | Visco et al. |
| 2009/0007961 | A1 | 1/2009 | Morooka |
| 2009/0035662 | A1 | 2/2009 | Scott et al. |
| 2009/0087742 | A1 | 4/2009 | Martinet et al. |
| 2009/0280410 | A1 | 11/2009 | Zaguib et al. |
| 2010/0216019 | A1 | 8/2010 | Morishima |
| 2010/0221596 | A1 | 9/2010 | Huggins et al. |
| 2012/0214047 | A1 | 8/2012 | Kwak et al. |
| 2012/0328936 | A1 | 12/2012 | Wessells et al. |
| 2013/0052538 | A1 | 2/2013 | Pasta et al. |
| 2013/0224632 | A1 | 8/2013 | Roumi |
| 2013/0260232 | A1 | 10/2013 | Lu et al. |

FOREIGN PATENT DOCUMENTS

| | | | | |
|---|---|---|---|---|
| EP | 0131392 | A1 | 1/1985 | |
| JP | EP 0086555 | A1 * | 8/1983 | .............. H01M 4/58 |
| WO | 2012177932 | A2 | 12/2012 | |
| WO | 2013032567 | A1 | 3/2013 | |
| WO | 2013157660 | A1 | 10/2013 | |
| WO | PCT/US13/68124 | | 11/2013 | |
| WO | PCT/US13/68130 | | 11/2013 | |
| WO | PCT/US13/68135 | | 11/2013 | |
| WO | PCT/US14/14512 | | 2/2014 | |
| WO | PCT/US14/32430 | | 3/2014 | |

OTHER PUBLICATIONS

Bellomo, A. Formation of Copper(II), Zinc(I), Silver(I), and Lead(II) Ferrocyanides. Talanta, 17, 1109 (1970).
Buser, H. J., et al. The Crystal Structure of Prussian Blue: Fe4[Fe(CN)6]3-xH2O. Inorg. Chem., 16, 2704 (1977).
Casado, J., et al. Photogalvanic Behavior of K3Mn(CN)6 In CN—Aqueous Solutions. Electrochim. Acta., 35, 427 (1990).
Catala, L., et al. Core-Multishell Magnetic Coordination Nanoparticles: Toward Multifunctionality on the Nanoscale. Angew. Chem. Int. Ed., 121, 189 (2009).
Clauss, V. D., et al. Über Hexacyanomanganate(I) und Hexacyanorenat(I), Z. Anorg. Allg. Chem., 297, 300 (1958).
Colin D. Wessells et al: "The Effect of Insertion Species on Nanostructured Open Framework Hexacyanoferrate Battery Electrodes", Journal of the Electrochemical Society, vol. 159, No. 2, Jan. 1, 2012 (Jan. 1, 2012 ), p. A98, XP055092033, ISSN: 0013-4651, DOI: 10.1149/2.060202jes.
Eftekhari, A. Fabrication of all-solid-state thin-film secondary cells using hexacyanometalate-based electrode materials. J. Power Sources, 132, 291 (2004).
Grabner, E. W., and Kalwellis-Mohn, S. Hexacyanoferrate layers as electrodes for secondary cells. J. Appl. Electrochem., 17, 653 (1987).
Griffith, W. P. Cyanide Complexes of the Early Transition Metals (Groups IVa-VIIa). Coord. Chem. Rev., 17, 177 (1975).
Her, J.-H., et al. Anomalous Non-Prussian Blue Structures and Magnetic Ordering of K2MnII[MnII(CN)6] and Rb2MnII[MnII(CN)6]. Inorg. Chem., 49, 1524 (2010).
Honda, K. and Hayashi, H. Prussian Blue Containing Nafion Composite Film as Rechareable Battery. J. Electrochem. Soc., 134, 1339 (1987).
Hongkyung Lee et al: "Sodium zinc hexacyanoferrate with a welldefined open framework as a positive electrode for sodium ion batteries", Chemical Communications, vol. 48, No. 67, Jan. 1, 2012 (Jan. 1, 2012 ), p. 8416, XP055092042, ISSN: 1359-7345, DOI: 10.1039/c2cc33771 a.
Huihui Wang et al: "One-step synthesis and self-organization of polypyrrole ultrathin films inlayed with Prussian blue nanoparticles induced by a drop of toluene solution on water surface", Thin Solid Films, Elsevier-Sequoias.A. Lausanne, CH, vol. 520, No. 6, Sep. 28, 2011 (Sep. 28, 2011), pp. 2026-2031, XP028444283, ISSN: 0040-6090, DOI: 10.1016/J.TSF.2011.09.077 [retrieved on Oct. 6, 2011].
Itaya, K., et al. Electrochemistry of Polynuclear Transition Metal Cyanides: Prussian Blue and Its Analogues. Acc. Chem. Res., 19, 162 (1986).
Jayalakshmi, M., and Scholz, F. Charge-discharge characteristics of a solid-state Prussian blue secondary cell. J. Power Sources, 87, 212 (2000).
Jayalakshmi, M., and Sholz, F. Performance characteristics of zinc hexacyanoferrate/Prussian blue and copper hexacyanoferrate/Prussian blue soid state secondary cells. J. Power Sources, 91, 217 (2000).
Jianping Li et al: "Highly Sensitive Molecularly Imprinted Electrochemical Sensor Based on the Double Amplification by an Inorganic Prussian Blue Catalytic Polymer and the Enzymatic Effect of Glucose Oxidase", Analytical Chemistry, vol. 84, No. 4, Feb. 21, 2012 (Feb. 21, 2012 ), pp. 1888-1893.
Kalwellis-Mohn, S., and Grabner, E. W. A Secondary Cell Based on Thin Film Layers of Zeolite-Like Nickel Hexacyanometallates. Electrochim. Acta., 34, 1265 (1989).
Kaneko, M., and Okada, T. A secondary battery composed of multilayer Prussian Blue and its reaction characteristics. J. Electroanal. Chem., 255, 45 (1988).
Kasem K K ED—Crupi DR et al: "Electrochemkal behavior of iron-hexacyanoruthenate(II) thin films in aqueous electrolytes: potential analytical and catalytic applications", Materials Science and Engineering B, Elsevier Sequoia, Lausanne, CH, vol. 83, No. 1-3, Jun. 21, 2001 (Jun. 21, 2001), pp. 97-105.
López-Cueto, G., et al. Fast disproportionation of hexacyanomanganate(III) in acidic solution. Formation of hexacyanomanganate(IV) and kinetics of its decomposition. Can. J. Chem., 64, 2301 (1986).
M. Presle et al: Controlled growth of core@shell heterostructures.
Messina, R., and Perichon, J. Mécanisme de la réduction électrochimique en milieu non aqueux de materiaux cathodiques utilizes dan les piles au lithium. V. Utilisation des hexacyanoferrates de fer (II et III) comme materiaux cathodiques reversibles. J. Appl. Electrochem., 10, 655 (1980).
Messina, R., Perichon, J., and Broussely, M. Mécanismes de la réduction électrochimique en milieu non aqueux de materiaux cathodiques utilizes dan les piles au lithium. IV. Réduction d'électrodes membranaires d'hexacyanoferrates (II et III) d'argent

(56) References Cited

OTHER PUBLICATIONS dans le mélange carbonate de propylene-1,2-diméthoxyéthane. J. Appl. Electrochem., 9, 677 (1979).

Neff, V. D. Some Performance Characteristics of a Prussian Blue Battery. J. Electrochem. Soc., 132, 1382 (1985).

Okubo, M., et al. Switching Redox-Active Sites by Valence Tautomerism in Prussian Blue Analaogues AxMny[Fe(CN)6] nH2O (A: K, Rb): Robust Frameworks for Reversible Li Storage. J. Phys. Chem. Lett., 1, 2063 (2010).

Pasta, M., et al. A high-rate and long cycle life aqueous electrolyte battery for grid-scale energy storage. Nature Comm., 3, 1149 (2012).

Rastler, D. Electricity Energy Storage Technology Options, Electric Power Research Institute, 1020676 (2010).

Robin, M. B., The Color and Electronic Configurations of Prussian Blue. Inorg. Chem., 1, 337 (1962).

Scholz, F., et al. The Formal Potentials of Solid Metal Hexacyanometalates. Angew. Chem. Int. Ed. Engl., 34, 2685 (1995).

Schwochau, V. K., et al., Darstellung and Eigenschaften von Kalium-cyanotechnetat(I), Z. Anorg. Allg. Chem., 319, 148 (1962).

Shannon, R. D. Revised Effective Ionic Raddi and Systematic Studies of Interatomic Distances in Halides and Chalcogenides, Acta Cryst., A32, 751 (1976).

Soto, M. B., et al. The thermodynamics of the insertion electrochemistry of solid metal hexacyanometallates. J. Electroanal. Chem., 521, 183 (2002).

Stilwell, D. E., et al. Electrochemical studies of the factors influencing the cycle stability of Prussian Blue films. J. Appl. Electrochem., 22, 325 (1992).

Wessells, C. D., et al. Copper hexacyanoferrate battery electrodes with long cycle life and high power. Nature Comm., 2, 550 (2011).

Wessells, C. D., et al. Nickel Hexacyanoferrate Nanoparticle Electrodes for Aqueous Sodium and Potassium Ion Batteries. Nano Lett., 11, 5421 (2011).

Wessells, C. D., et al. The Effect of Insertion Species on Nanostructured Open Framework Hexacyanoferrate Battery Electrodes. J. Electrochem. Soc., 159, A98 (2012).

Wessells, C. D., et al. Tunable Reaction Potentials in Open Framework Nanoparticle Battery Electrodes for Grid-Scale Energy Storage. ACS Nano, 6, 1688 (2012).

Xiaoouan Lu et al: "A simple and an efficient strategy to synthesize multi-component nanocomposites for biosensor applications", Anal Ytica Chimica Acta, Elsevier, Amsterdam, NL, vol. 711, Nov. 2, 2011 (Nov. 2, 2011), pp. 40-45, XP028339021, ISSN: 0003-2670, DOI: 10.1016/J.ACA.2011.11.005 [retrieved on Nov. 11, 2011].

Zadronecki, M., et al. High Affinity of Thallium Ions to Copper Hexacyanoferrate Films. J. Electrochem. Soc., 148, E348 (2001).

U.S. Appl. No. 61/722,049, filed Nov. 2, 2012.
U.S. Appl. No. 61/760,402, filed Feb. 4, 2013.
U.S. Appl. No. 61/810,684, filed Apr. 10, 2013.
U.S. Appl. No. 13/892,777, filed May 13, 2013.
U.S. Appl. No. 13/892,982, filed May 13, 2013
U.S. Appl. No. 13/892,174, filed May 13, 2013.
U.S. Appl. No. 13/904,874, filed May 29, 2013.
U.S. Appl. No. 14/231,571, filed Mar. 31, 2014.

Roman Imhof et al. "In Situ Investigation of the Electrochemical Reduction of Carbonate Electrolyte Solutions at Graphite Electrodes," J. Electrochem. Soc., vol. 145, No. 4, Apr. 1998.

Hiroshi Senoh et al., "Sulfone-Based Electrolyte Solutions for Rechargeable Magnesium Batteries Using 2,5-Dimethoxy-1,4-benzoquinone Positive Electrode," J. Electrochem. Soc. 161 (9) A1315-A1320 (2014).

Yuu Watanabe et al., "Electrochemical properties and lithium ion solvation behavior of sulfone-ester mixed electrolytes for high-voltage rechargeable lithium cells," Journal of Power Sources, vol. 179, 770-779 (2008).

IUPAC-NIST Solubility Data Series. 83. Acetonitrile: Ternary and Quaternary Systems, published online Sep. 5, 2007.

Jayalakshmi, M. et al., "Electrochemical Behaviour of Prussian Blue Deposits in Presence of Some Non-Aqueous Background Solutions" Bulletin of Electrochemistry 16 (3) Mar. 2000, pp. 123-129.

Starkovich, J. A, et al., "Solubilities of some chloride and perchlorate salts in sulfolane", J. inorg. nucl. Chem, 1972, vol. 34, pp. 789-791.

Dinh, H, et al., "Electrochemical Analysis of Conductive Polymer-Coated LiFePO4 Nanocrystalline Cathodes with Controlled Morphology" Electroanalysis 2011, 23, No. 9, 2079-2086, (C) Wiley-VCH Verlag GmbH & Co. KGaA, Weinham.

\* cited by examiner

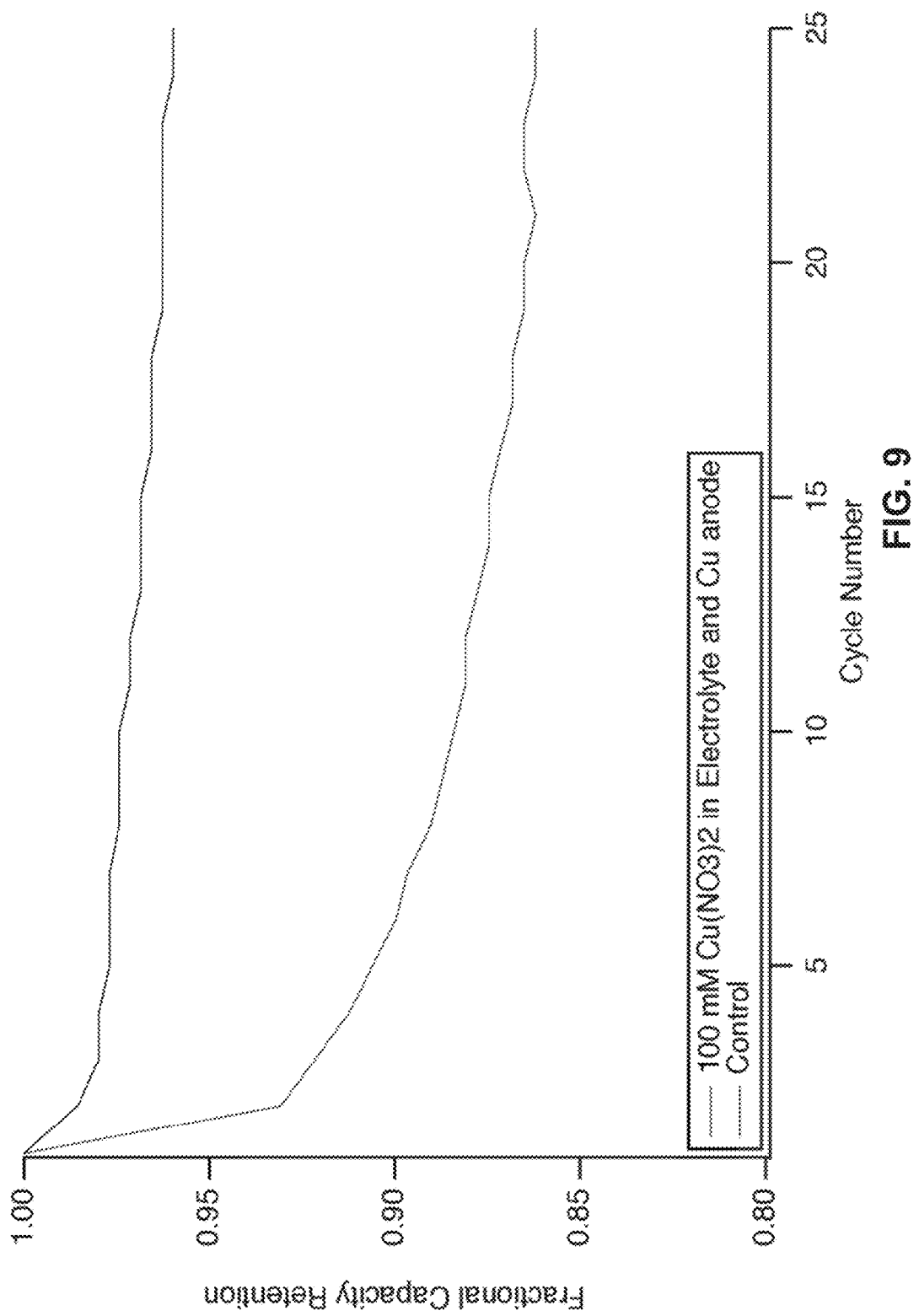

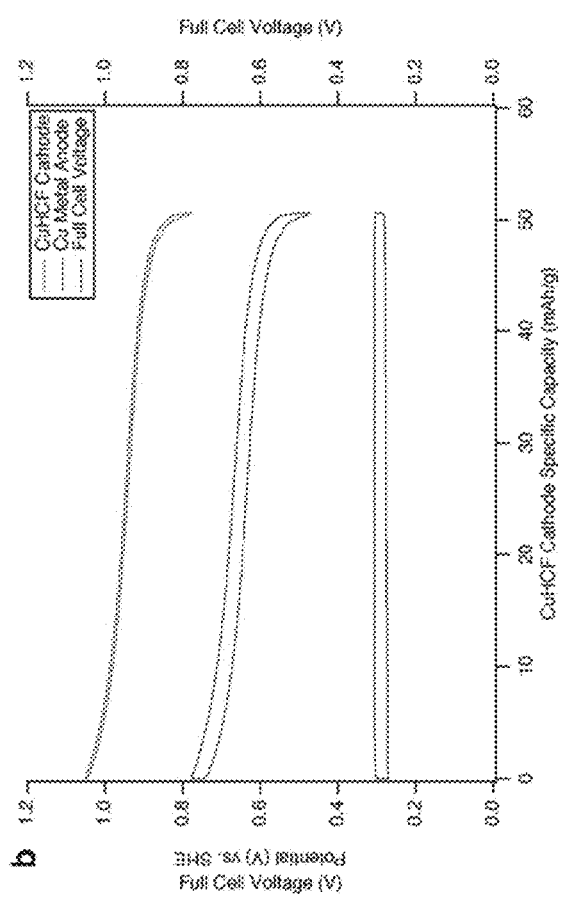
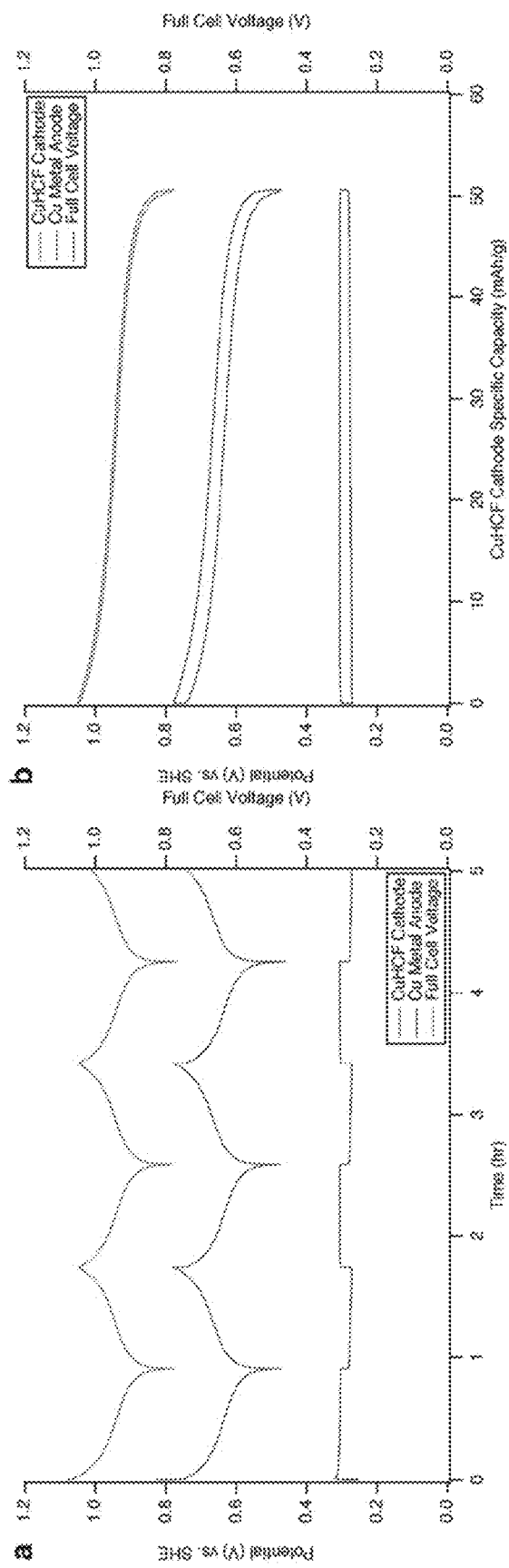
FIG. 10a
FIG. 10b

STABILIZATION OF BATTERY ELECTRODES USING POLYMER COATINGS

CROSS REFERENCE TO RELATED APPLICATIONS

This application claims benefit of U.S. patent application Ser. No. 61/722,049 filed 2 Nov. 2012 and is related to U.S. patent application Ser. No. 13/482,793, filed 29 May 2012 and entitled "HIGH RATE, LONG CYCLE LIFE BATTERY ELECTRODE MATERIALS WITH AN OPEN FRAMEWORK STRUCTURE," that claims benefit of U.S. Provisional Application Ser. No. 61/499,877, filed on Jun. 22, 2011, and the benefit of U.S. Provisional Application Ser. No. 61/529,766, filed on Aug. 31, 2011, and U.S. patent application Ser. No. 13/482,796, filed 29 May 2012 and entitled "HIGH RATE, LONG CYCLE LIFE ELECTROCHEMICAL ENERGY STORAGE DEVICES," that claims benefit of U.S. Provisional Application Ser. No. 61/529,766, filed on Aug. 31, 2011 and European Patent Application EP0086555 published 24 Aug. 1983, all of which are expressly incorporated by reference thereto in their entireties for all purposes.

STATEMENT REGARDING FEDERALLY SPONSORED RESEARCH OR DEVELOPMENT

This invention was made with government support under ARPA-E Award No. DE-AR000300 With Alveo Energy, Inc., awarded by DOE. The government has certain rights in the invention.

FIELD OF THE INVENTION

The present invention relates generally to rechargeable energy accumulators, and more specifically, but not exclusively, to stabilization of electrodes used with aqueous electrolytes.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In recent years, a variety of battery technologies have been developed for portable and stationary applications. These include lead acid, lithium ion, nickel/metal hydride, sodium sulfur, and flow batteries, among others. Unfortunately, not one of these technologies provides a sufficiently low cost, long enough cycle life, high enough rate capability, or high enough energy efficiency to provide useful energy storage and power for short-term, transient stationary storage applications. This includes the mitigation of costly transients on the electric grid, short term back up power and load management, regulatory services, and the deferral of investments in other power grid infrastructure components. Batteries may also support off-grid stationary electronic systems, whether by providing short-term backup power, or for facilities not connected to larger grids. Another large, unfulfilled market for batteries is the microhybrid, or stop-start automotive battery. The lead acid batteries currently used for this application must be oversized by an order of magnitude to avoid destruction due to repeated deep discharge cycling, resulting in heavy, expensive systems.

Conventional battery electrode materials cannot survive for enough deep discharge cycles to be used for these transient applications related to the electric grid or microhybrid vehicles. Their rate capability is also limited by poor kinetics for ion transfer and diffusion, or by the formation of new material phases. The use of Prussian Blue analogues, which are transition metal cyanides of the general formula $A_xP_y[R(CN)_6]_z \cdot nH_2O$ (A=alkali cation, P and R=transition metal cations, $0 \le x \le 2$, $0 \le y \le 4$, $0 \le z \le 1$, $0 \le n$) as battery electrode materials has been demonstrated. Such electrodes offer longer cycle life, faster kinetics, and higher energy efficiency than any other family of insertion electrodes when operated in aqueous alkali salt electrolytes. However, Prussian Blue analogues have trace solubility in these aqueous electrolytes. The gradual dissolution of Prussian Blue analogue electrodes results in capacity loss of the electrode, limiting the calendar life of the battery. In one case, however, a Prussian Blue analogue was observed to have zero capacity loss after over 5,000 cycles and two months of operation, indicating that under some conditions, these electrodes can be made stable.

What is needed is a system and method for slowing and/or preventing dissolution of electrodes into an operating electrolyte to extend a calendar life of the electrodes.

BRIEF SUMMARY OF THE INVENTION

Disclosed is a system and method for slowing and/or preventing dissolution of electrodes into an operating electrolyte to extend a calendar life of the electrodes.

The following summary of the invention is provided to facilitate an understanding of some of technical features related to an embodiment related to stabilization of Prussian Blue analogue battery electrodes, and is not intended to be a full description of the present invention. A full appreciation of the various aspects of the invention can be gained by taking the entire specification, claims, drawings, and abstract as a whole. The present invention is applicable to other cell chemistries and analogues.

A battery (cell) including: an aqueous electrolyte and two electrodes (an anode and a cathode), one or both of which is a Prussian Blue analogue material of the general chemical formula $A_xP[R(CN)_{6-j}L_j]_z \cdot nH2O$, where: A is a monovalent cation such as $Na^+$, $K^+$, $Li^+$, or $NH_4^+$, or a divalent cation such as $Mg^{2+}$ or $Ca^{2+}$; P is a transition metal cation such as $V^{2+}$, $V^{3+}$, $Cr^{2+}$, $Cr^{3+}$, $Mn^{2+}$, $Mn^{3+}$, $Fe^{2+}$, $Fe^{3+}$, $Co^{2+}$, $Co^{3+}$, $Ni^{2+}$, $Cu_+$, $Cu^{2+}$, or $Zn^{2+}$, or another metal cation such as $Al^{3+}$, $Sn^{2+}$, $In^{3+}$, or $Pb^{2+}$; R is a transition metal cation such as $V^{2+}$, $V^{3+}$, $Cr^{2+}$, $Cr^{3+}$, $Mn^{2+}$, $Mn^{3+}$, $Fe^{2+}$, $Fe^{3+}$, $Co^{2+}$, $Co^{3+}$, $Ru^{2+}$, $Ru^{3+}$, $Os^{2+}$, $Os^{3+}$, $Ir^{2+}$, $Ir^{3+}$, $Pt^{2+}$, or $Pt^{3+}$; L is a ligand that may be substituted in the place of a $CN^-$ ligand, including CO (carbonyl), NO (nitrosyl), or $Cl^-$; $0 \le x \le 2$; $0 \le z \le 1$; and $0 \le n \le 5$.

A battery including an electrolyte in contact with two electrodes, in which a conformal coating of a Prussian Blue analogue of the general chemical formula described herein on the surface of one or more of the electrodes prevents dissolution of that electrode into the electrolyte.

A battery including an electrolyte in contact with two electrodes, in which a conformal coating of a Prussian Blue analogue of the general chemical formula described herein on the surface of the individual particles of the electrochemically active material within the electrode prevents dissolution of that material into the electrolyte.

A battery including an electrolyte in contact with two electrodes, in which a conformal coating of a mixed conducting polymer such as polypyrrole on the surface of one or more of the electrodes prevents dissolution of that electrode into the electrolyte.

A battery including an electrolyte in contact with two electrodes, in which a conformal coating of a mixed conducting polymer such as polypyrrole on the surface of the individual particles of the electrochemically active material within the electrode prevents dissolution of that material into the electrolyte.

An electrochemical apparatus, including an aqueous electrolyte having a plurality of ions; a first electrode disposed in said aqueous electrolyte, said first electrode including a first Prussian Blue analogue material having a general chemical formula $A_xP_y[R(CN)_{6-j}L_j]_z \cdot nH_2O$, where: A is a cation, P is a metal cation, R is a transition metal cation, and L is a ligand substitutable in the place of a $CN^-$ ligand, and $0 \leq j \leq 6$, $0 \leq x \leq 2$, $0 \leq y \leq 4$, $0 \leq z \leq 1$, and $0 \leq n \leq 5$ wherein said first Prussian Blue analogue material has a first specific chemical formula conforming to said general chemical formula including a first particular cation P1 and a first particular cation R1 and wherein said first Prussian Blue analogue material has a first rate of electrochemical capacity loss when disposed in said aqueous electrolyte; and a first conformal polymer layer disposed on said first electrode, said first conformal polymer layer conductive to said plurality of ions; wherein said first electrode with said first conformal polymer layer has a second rate of electrochemical loss less than said first rate of electrochemical capacity loss when said first electrode is disposed in said aqueous electrolyte.

An electrochemical apparatus, including an aqueous electrolyte having a plurality of ions; a first electrode disposed in said aqueous electrolyte, said first electrode including a plurality of nanoparticles of a first Prussian Blue analogue material having a general chemical formula $A_xP_y[R(CN)_{6-j}L_j]_z \cdot nH_2O$, where: A is a cation, P is a metal cation, R is a transition metal cation, and L is a ligand substitutable in the place of a $CN^-$ ligand, and $0 \leq j \leq 6$, $0 \leq x \leq 2$, $0 \leq y \leq 4$, $0 \leq z \leq 1$, and $0 \leq n \leq 5$ wherein said first Prussian Blue analogue material has a first specific chemical formula conforming to said general chemical formula including a first particular cation $P_1$ and a first particular cation $R_1$, wherein said first Prussian Blue analogue material has a first rate of electrochemical capacity loss when disposed in said aqueous electrolyte, and wherein each nanoparticle of said plurality of nanoparticles includes an outside surface; and a first conformal polymer layer disposed on said outside surfaces, said first conformal polymer layer conductive to said plurality of ions; wherein said first electrode with said first conformal polymer layers disposed on said outside surfaces has a second rate of electrochemical loss less than said first rate of electrochemical capacity loss when said first electrode is disposed in said aqueous electrolyte.

A method for manufacturing an electrochemical apparatus including a first electrode having a first Prussian Blue analogue material with a general chemical formula $A_xP_y[R(CN)_{6-j}L_j]_z \cdot nH_2O$, where: A is a cation, P is a metal cation, R is a transition metal cation, and L is a ligand substitutable in the place of a $CN^-$ ligand, and $0 \leq j \leq 6$, $0 \leq x \leq 2$, $0 \leq y \leq 4$, $0 \leq z \leq 1$, and $0 \leq n \leq 5$ wherein the first Prussian Blue analogue material has a first specific chemical formula conforming to the general chemical formula including a first particular cation $P_1$ and a first particular cation $R_1$ and wherein the first Prussian Blue analogue material has a first rate of electrochemical capacity loss when disposed in an aqueous electrolyte, the method including (a) forming a first conformal polymer layer on the first electrode, said first conformal polymer layer conductive to a plurality of ions; and (b) disposing the first electrode in the aqueous electrolyte including said plurality of ions; wherein the first electrode with said first conformal polymer layer has a second rate of electrochemical loss less than the first rate of electrochemical capacity loss when the first electrode is disposed in said aqueous electrolyte.

A method for decreasing a rate of electrochemical capacity loss of a rechargeable energy storing electrochemical cell including an aqueous electrolyte having a plurality of ions; a first electrode disposed in the aqueous electrolyte, the first electrode including a first Prussian Blue analogue material having a general chemical formula $A_xP_y[R(CN)_{6-j}L_j]_z \cdot nH_2O$, where: A is a cation, P is a metal cation, R is a transition metal cation, and L is a ligand substitutable in the place of a $CN^-$ ligand, and $0 \leq j \leq 6$, $0 \leq x \leq 2$, $0 \leq y \leq 4$, $0 \leq z \leq 1$, and $0 \leq n \leq 5$ wherein the first Prussian Blue analogue material has a first specific chemical formula conforming to the general chemical formula including a first particular cation $P_1$ and a first particular cation $R_1$ and wherein the first Prussian Blue analogue material has a first rate of electrochemical capacity loss when disposed in the aqueous electrolyte; and a second electrode disposed in the aqueous electrolyte, the second electrode including a second Prussian Blue analogue material having the general chemical formula wherein the second Prussian Blue analogue material has a second specific chemical formula conforming to the general chemical formula different from the first specific chemical formula, and wherein the second Prussian Blue analogue material has a third rate of electrochemical capacity loss when disposed in the aqueous electrolyte; the method including (a) forming a first conformal polymer layer on the first electrode, said first conformal polymer layer conductive to a plurality of ions; (b) forming a second conformal polymer layer on the second electrode, said second conformal polymer layer conductive to a plurality of ions; (c) disposing the first electrode in the aqueous electrolyte including said plurality of ions; (d) disposing the second electrode in the aqueous electrolyte including said plurality of ions; wherein the first electrode with said first conformal polymer layer has a second rate of electrochemical loss less than the first rate of electrochemical capacity loss when the first electrode is disposed in said aqueous electrolyte; and wherein the second electrode with said second conformal polymer layer has a fourth rate of electrochemical loss less than the third rate of electrochemical capacity loss when the second electrode is disposed in said aqueous electrolyte.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 9 illustrates a Cycle life of CuHCF in 1 M KNO3 pH2 with and without Cu2+ added;

FIG. 10 illustrates a Galvanostatic cycling of CuHCF/Cu2+/Cumetal;

DETAILED DESCRIPTION OF THE INVENTION

Embodiments of the present invention provide a system and method for slowing and/or preventing dissolution of electrodes into an operating electrolyte to extend a calendar life of the electrodes. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
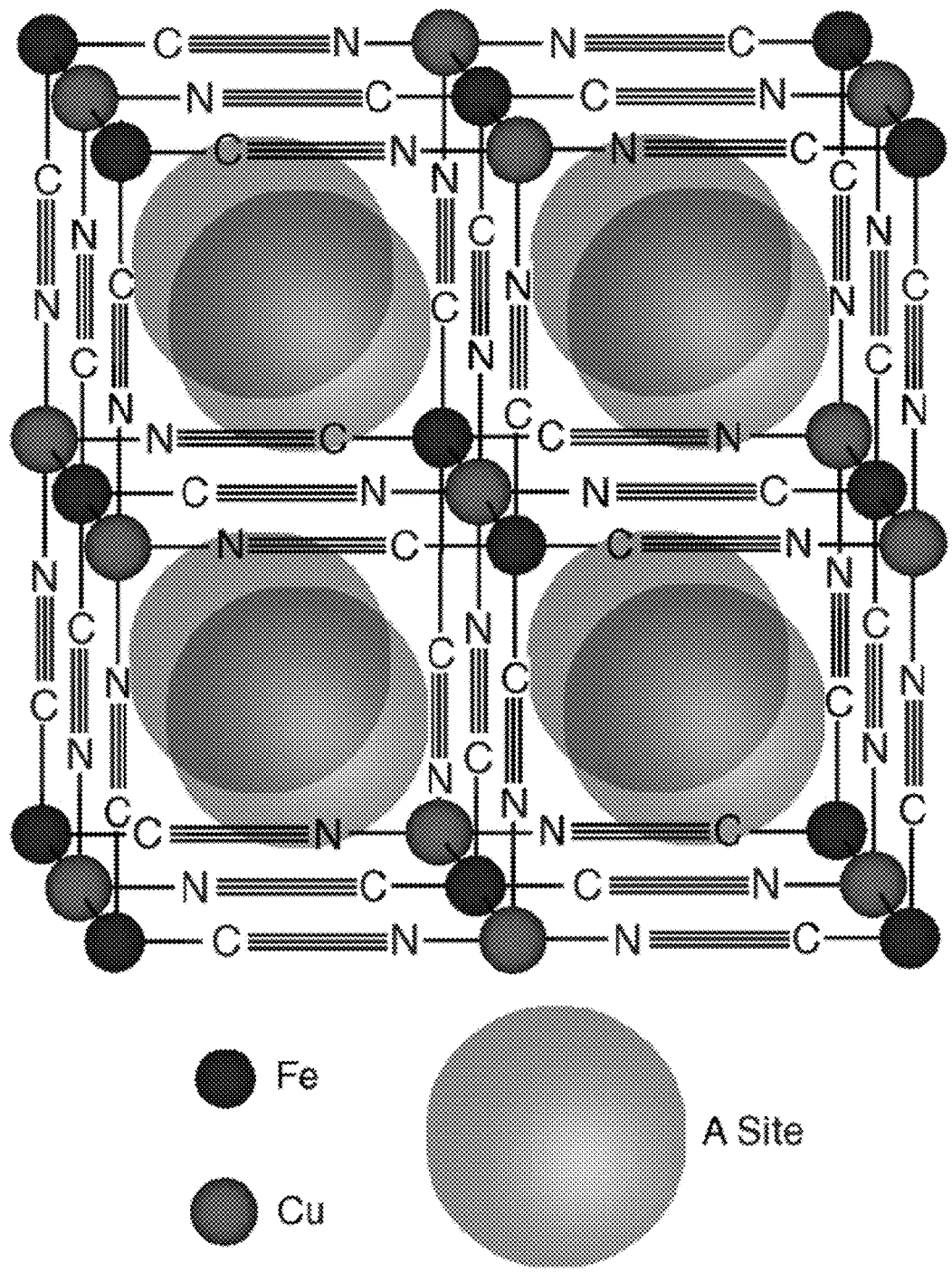
FIG. 1 illustrates a unit cell of the Prussian Blue crystal structure.

FIG. 1 illustrates a unit cell of the Prussian Blue crystal structure. The unit cell of copper hexacyanoferrate, a Prussian Blue analogue. In this material and all other Prussian Blue analogues, transition metal cations are linked in a face centered cubic framework by cyanide bridging ligands. In this case, iron is six-fold carbon coordinated, while copper is six-fold nitrogen coordinated. Each unit cell contains eight smaller cubic subcells, at the center of which is a large interstitice designated as the "A Site". The A Sites contain zeolitic water and mobile alkali cations such as Na+ or K+. During the electrochemical cycling of a Prussian Blue analogue, alkali cations are inserted or removed from the A Sites.

Figure 2:
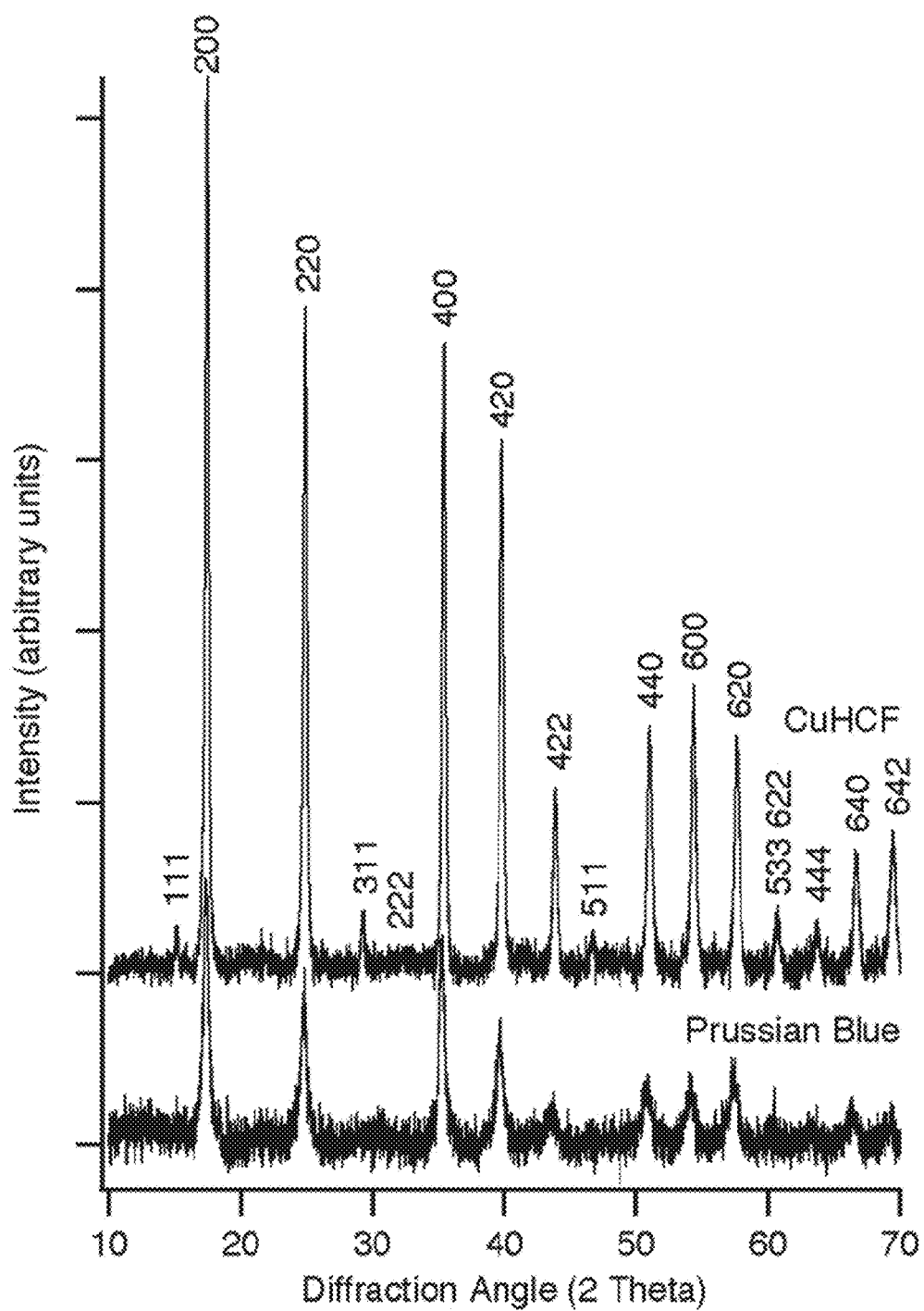
FIG. 2 illustrates an X-ray diffraction spectrum of CuHCF.

FIG. 2 illustrates an X-ray diffraction spectrum of CuHCF. The fully indexed powder X-ray diffraction spectra of copper hexacyanoferrate and Prussian Blue. Copper hexacyanoferrate has the well-known face-centered cubic open framework structure of Prussian Blue.

Figure 3:
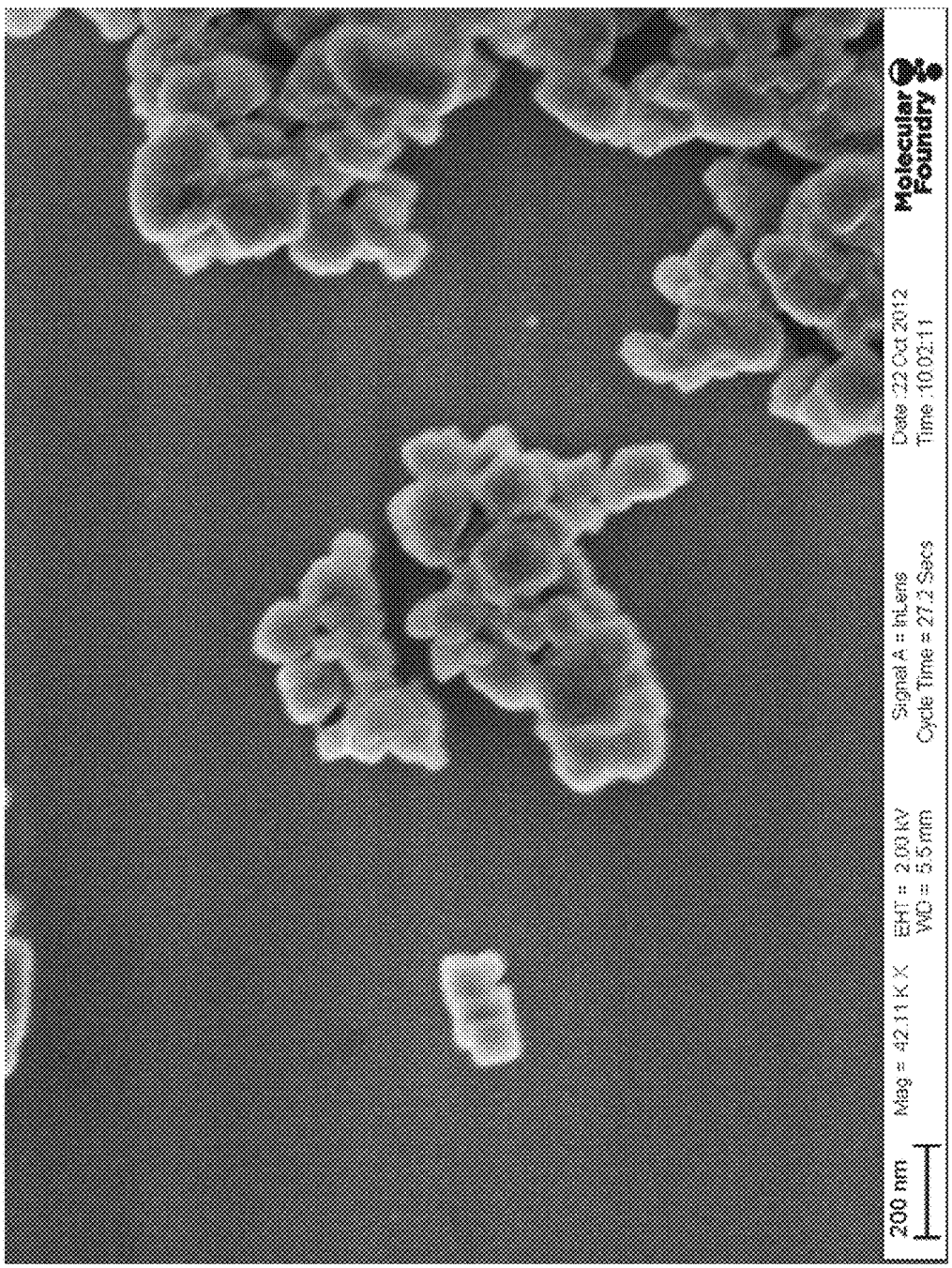
FIG. 3 illustrates a micrograph of CuHCF.

FIG. 3 illustrates a micrograph of CuHCF. Scanning electron microscopy of copper hexacyanoferrate shows that the material is composed of agglomerations of 20-50 nm grains. These agglomerations can be as large as several microns.

Figure 4:
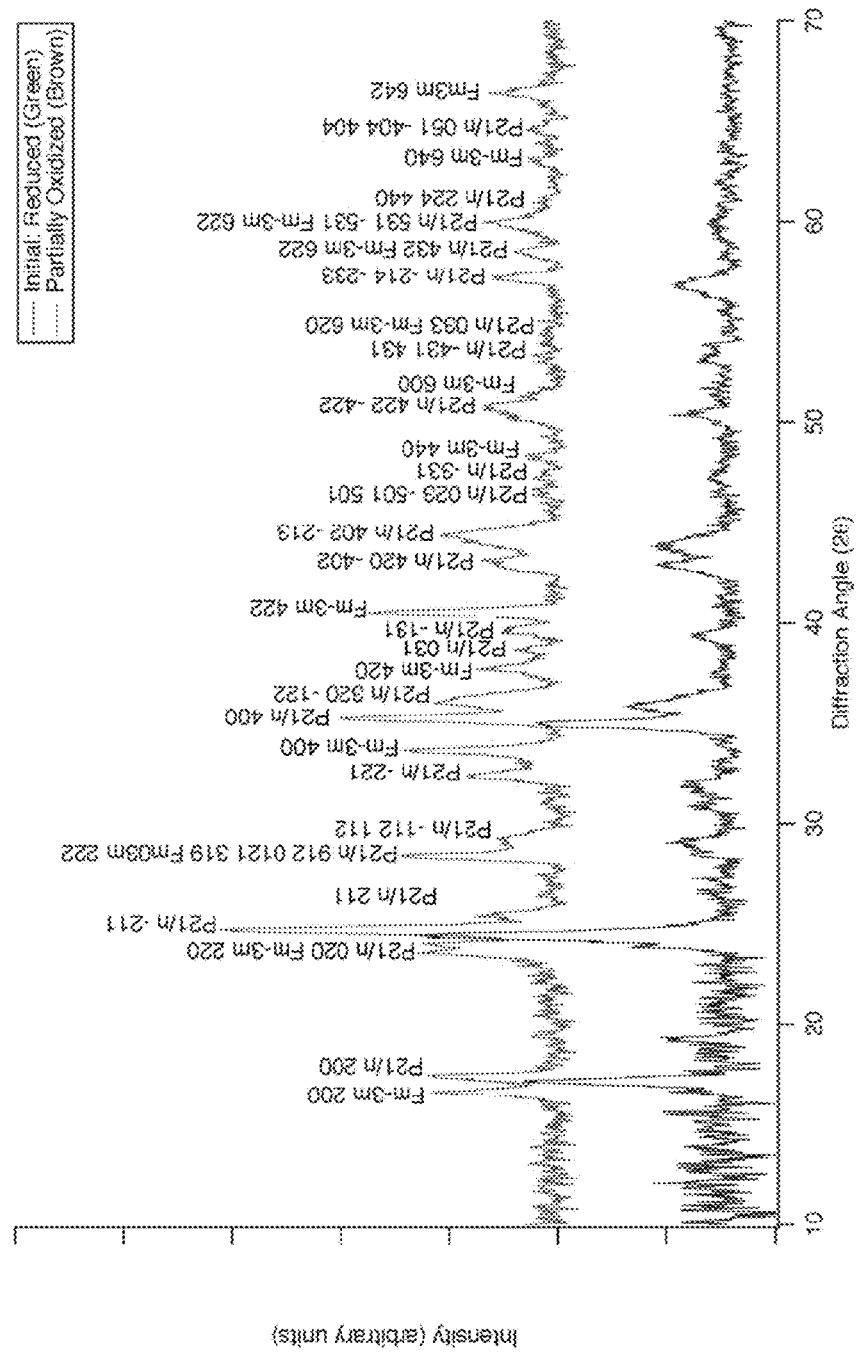
FIG. 4 illustrates X-ray diffraction spectra of MnHCMn.

FIG. 4 illustrates X-ray diffraction spectra of MnHCMn. The powder X-ray diffraction spectrum of freshly synthesized, fully reduced manganese(II) hexacyanomanganate (II), and of the same material after partial oxidation. In the latter case, a symmetry-breaking distortion in the framework structure is eliminated during oxidation, forming the more common face-centered cubic phase (as in FIG. 1 and FIG. 2).

Figure 5:
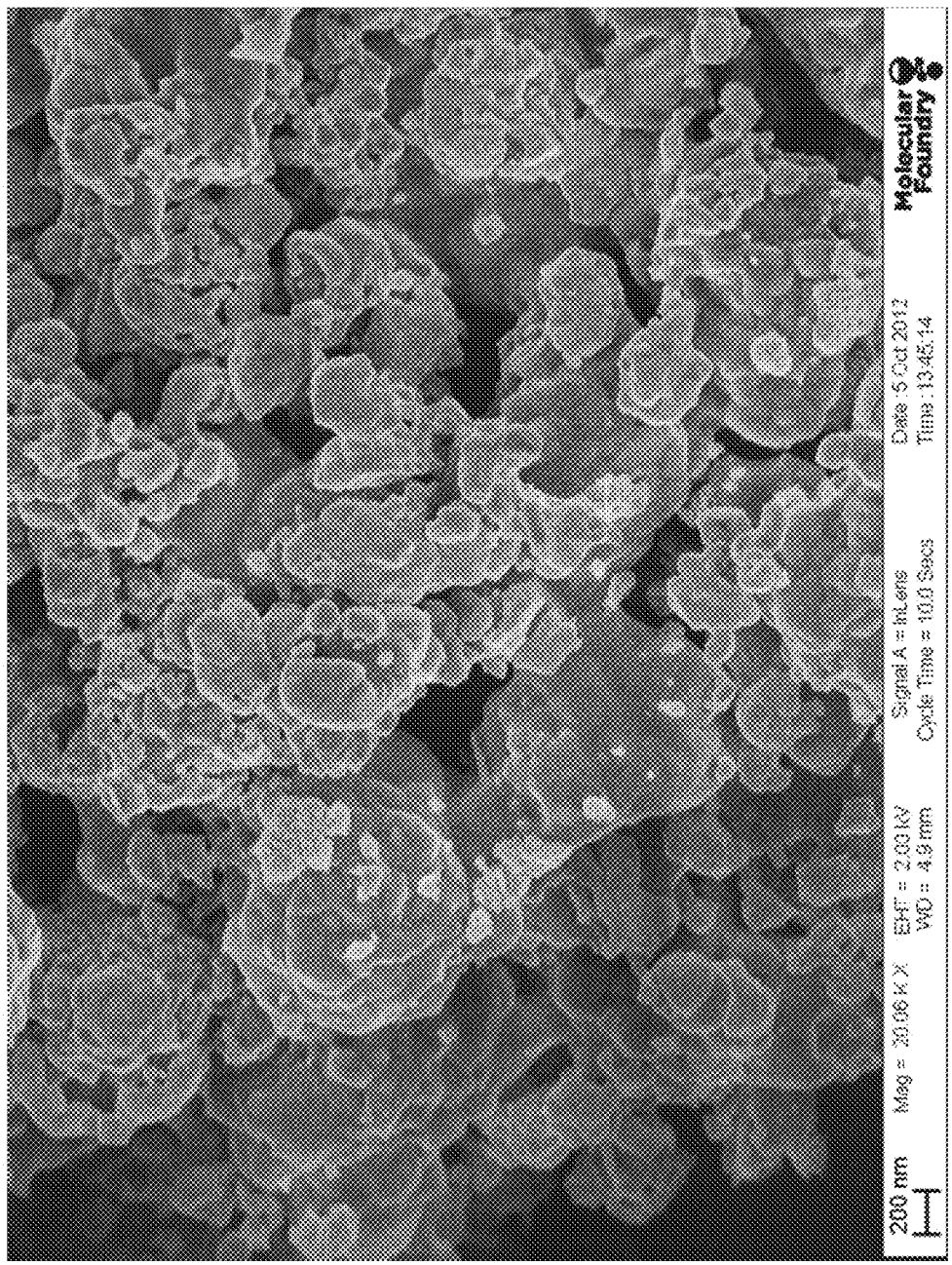
FIG. 5 illustrates a micrograph of MnHCMn.

FIG. 5 illustrates a micrograph of MnHCMn. Scanning electron microscopy of manganese hexacyanomanganate, as synthesized by a simple, one-step synthesis.

Figure 6:
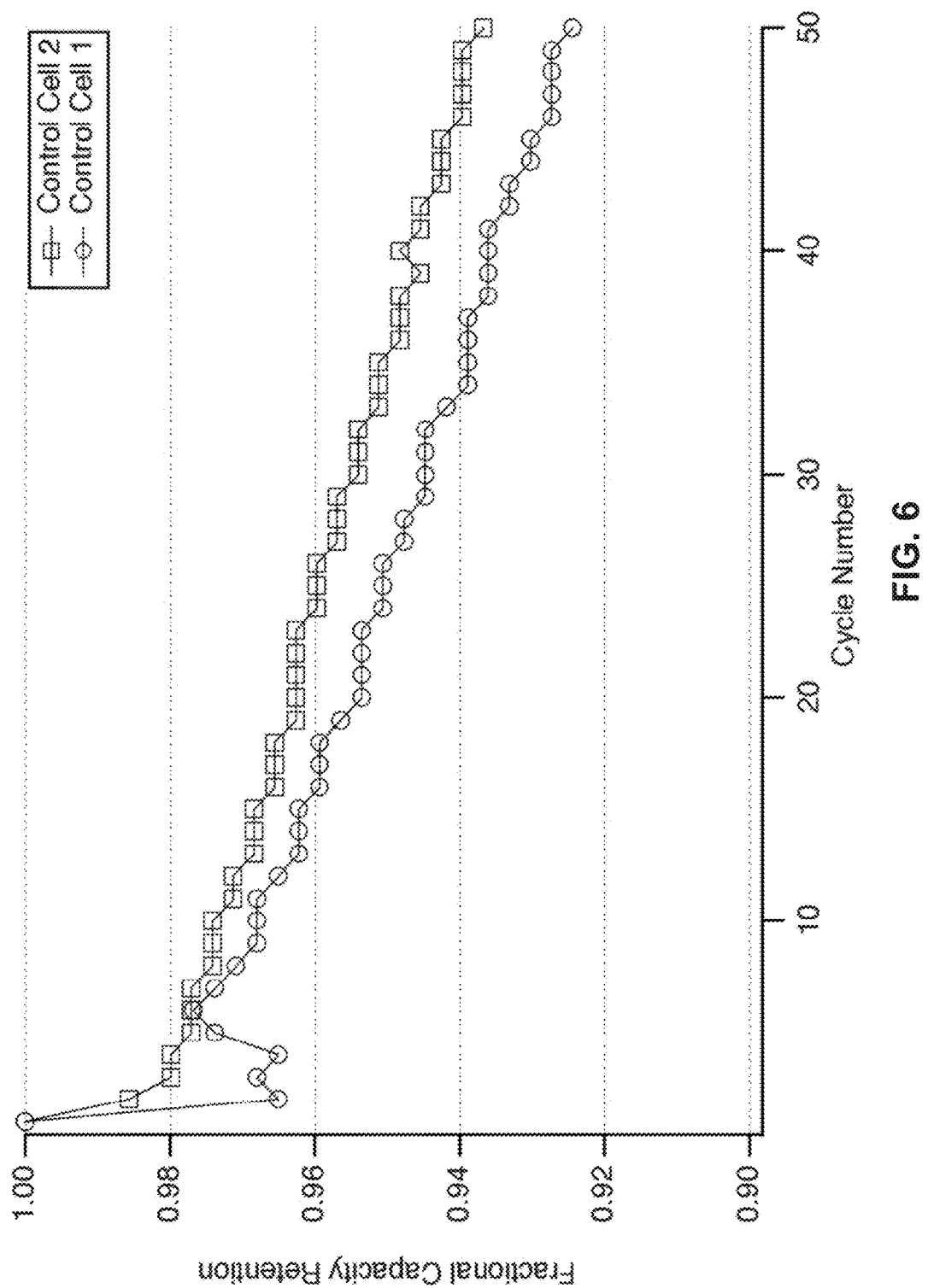
FIG. 6 illustrates baseline/control electrochemical cycling of CuHCF.

FIG. 6 illustrates baseline/control electrochemical cycling of CuHCF. The fractional capacity retention of copper hexacyanoferrate during galvanostatic cycling at a 1C rate between 0.8 and 1.05 V vs. SHE in 1 M KNO3 (pH=2) with a Ag/AgCl reference electrode and an activated charcoal counter electrode. These two cells represent a consistently observed loss of 7%/50 cycles under these conditions.

Figure 7:
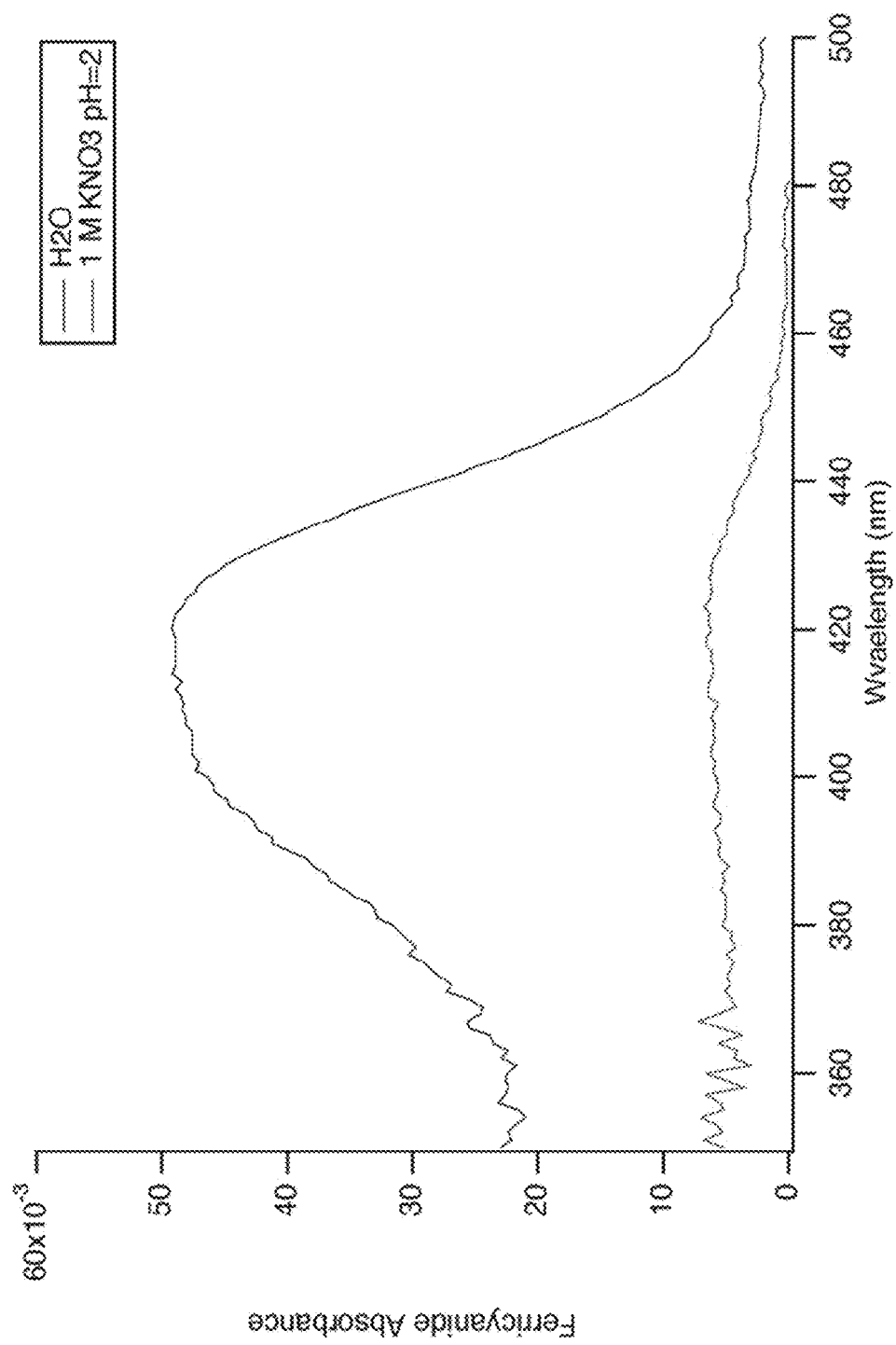
FIG. 7 illustrates a UV-visible spectroscopy of CuHCF in water and 1 M KNO3 pH2.

FIG. 7 illustrates a UV-visible spectroscopy of CuHCF in water and 1 M KNO3 pH2. Ultraviolet-visible absorbance spectroscopy of aqueous solutions that had contained 1 mg CuHCF electrode per 1 g of solution for 24 hours. The presence of concentrated K+ drastically reduces the soluble ferricyanide signal (peak at 420 nm).

Figure 8:
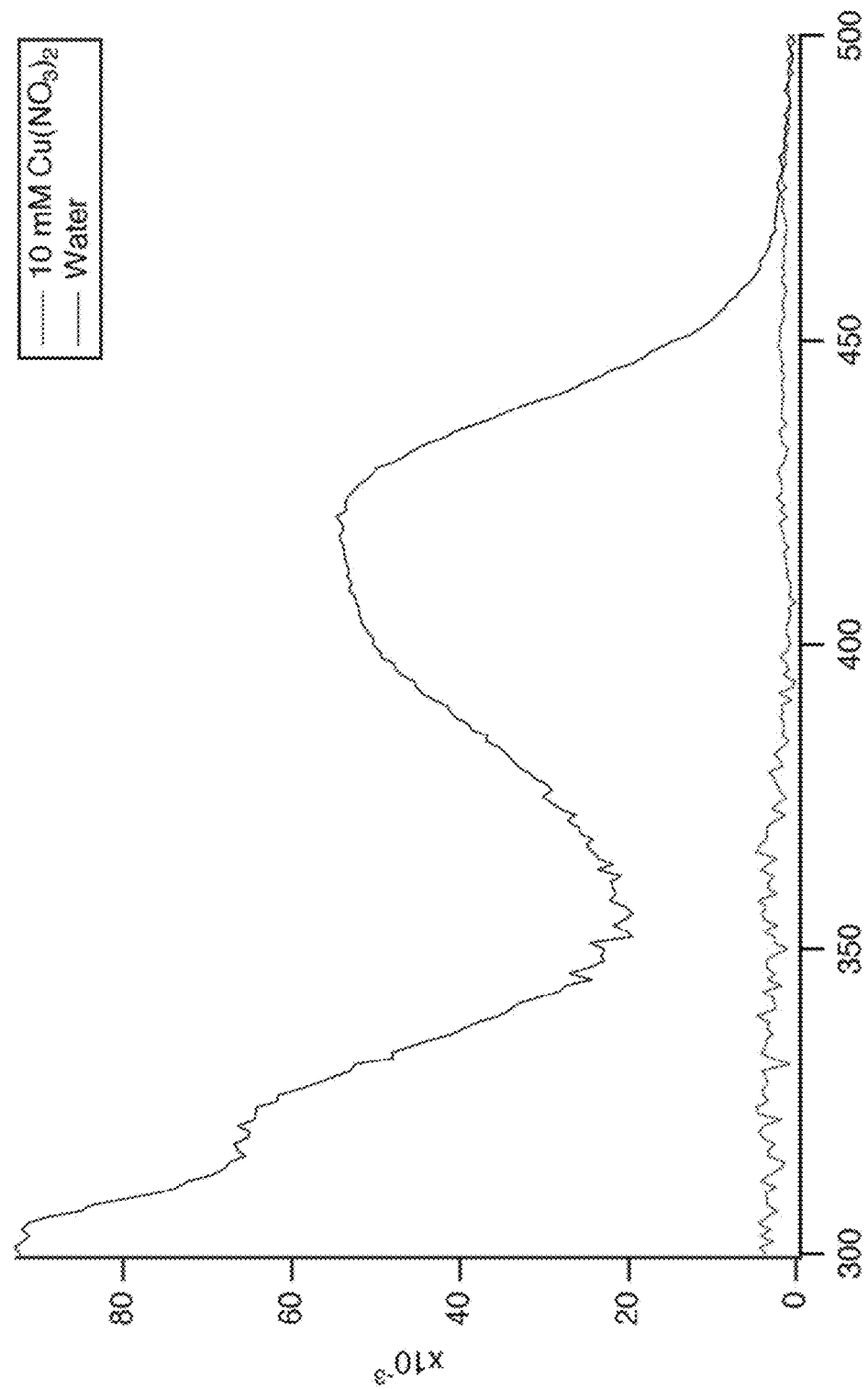
FIG. 8 illustrates an ultraviolet-visible absorbance spectrum of CuHCF in water and 10 mM Cu2+.

FIG. 8 illustrates an ultraviolet-visible absorbance spectrum of CuHCF in water and 10 mM Cu2+. The ultraviolet-visible absorbance spectra of solutions that had contained 1 mg CuHCF electrode per 1 g of solution for 24 hours. The addition of dilute (10 mM) copper nitrate results in a near-total elimination of the absorbance peak due to soluble ferricyanide. This demonstrates that Pm+ electrolyte additives slow or prevent the dissolution of APR(CN)6 Prussian Blue analogues.

FIG. 9 illustrates a Cycle life of CuHCF in 1 M KNO3 pH2 with and without Cu2+ added. Galvanostatic cycling of copper hexacyanoferrate against a metallic copper anode in 1 M KNO3/0.1 M Cu(NO3)2 (pH=2) at a 1C rate results in a steep initial capacity loss, followed by stabilization of the electrode. In contrast, the rate capacity loss observed in a control cell containing an activated charcoal anode and no Cu(NO3)2 in the electrolyte is constant. After 25 cycles, the rate of capacity loss is greater in the control cell than in the cell containing the Cu(NO3)2 electrolyte additive and the Cu metal anode.

FIG. 10 illustrates a Galvanostatic cycling of CuHCF/Cu2+/Cumetal in 2 sub-figures. FIG. 10a): The potential profiles of the copper hexacyanoferrate cathode and the copper anode, and the full cell voltage, during galvanostatic cycling at a 1C rate in 1 M KNO3 (pH=2) with 0.1 M Cu(NO3)3 added. FIG. 10b) The same data, plotted as a function of the specific capacity of the copper hexacyanoferrate cathode. Cycling is highly reversible.

Figure 11:
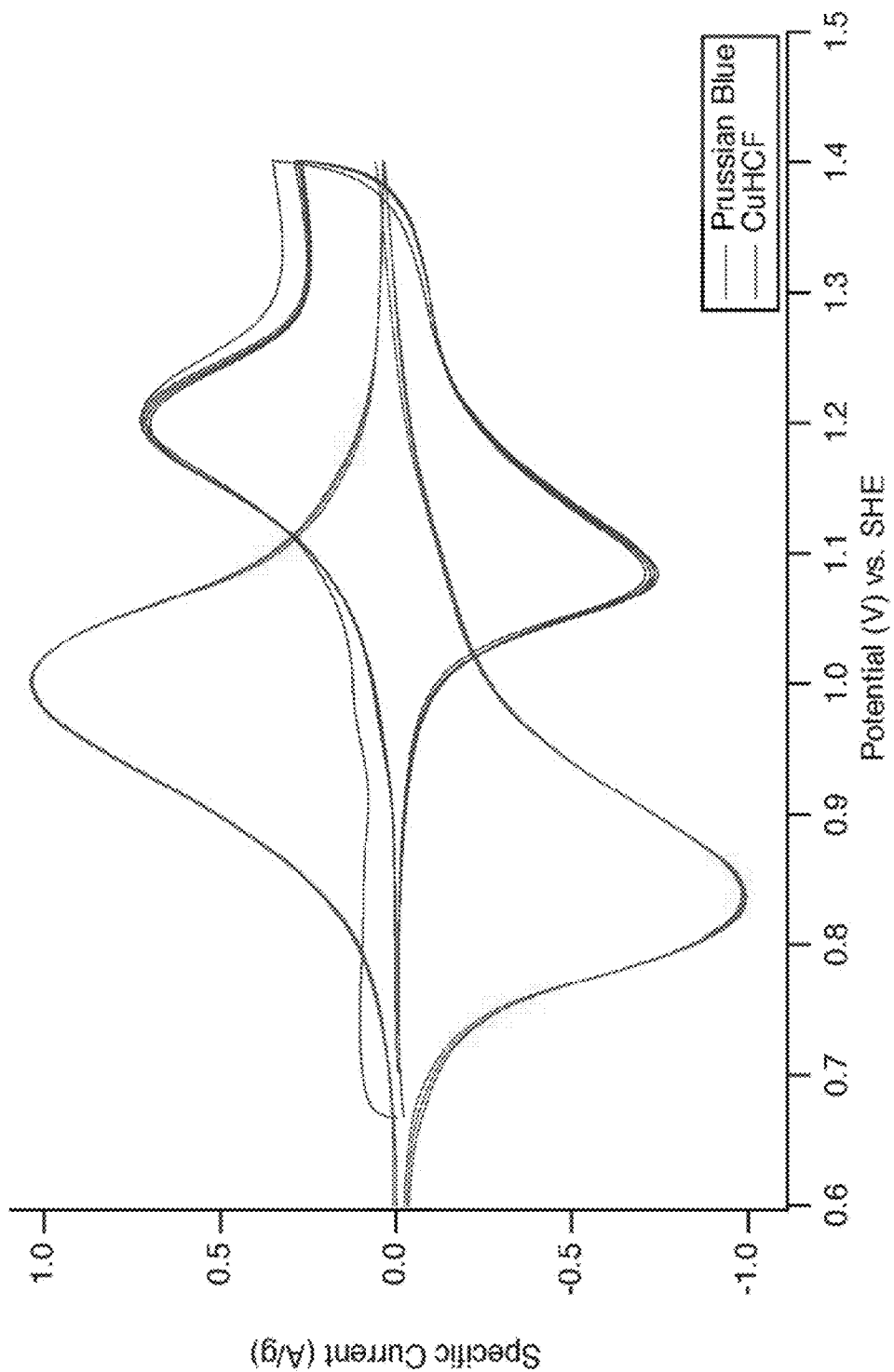
FIG. 11 illustrates a Cyclic voltammetry of CuHCF and PB/BG.

FIG. 11 illustrates a Cyclic voltammetry of CuHCF and PB/BG. Cyclic voltammetry (scan rate 1 mV/s) of copper hexacyanoferrate and Prussian Blue electrodes in 1 M KNO3 (pH=2) electrolyte. The reaction potential of copper hexacyanoferrate is centered at 0.95 V, while the oxidation of Prussian Blue to Berlin Green is centered at nearly 1.2 V. This means that copper hexacyanoferrate can be fully oxidized before appreciable oxidation of the Prussian Blue occurs. In the case of a Prussian Blue coating on a copper hexacyanoferrate electrode, the electrode can be charged and discharged without oxidizing the coating.

Figure 12:
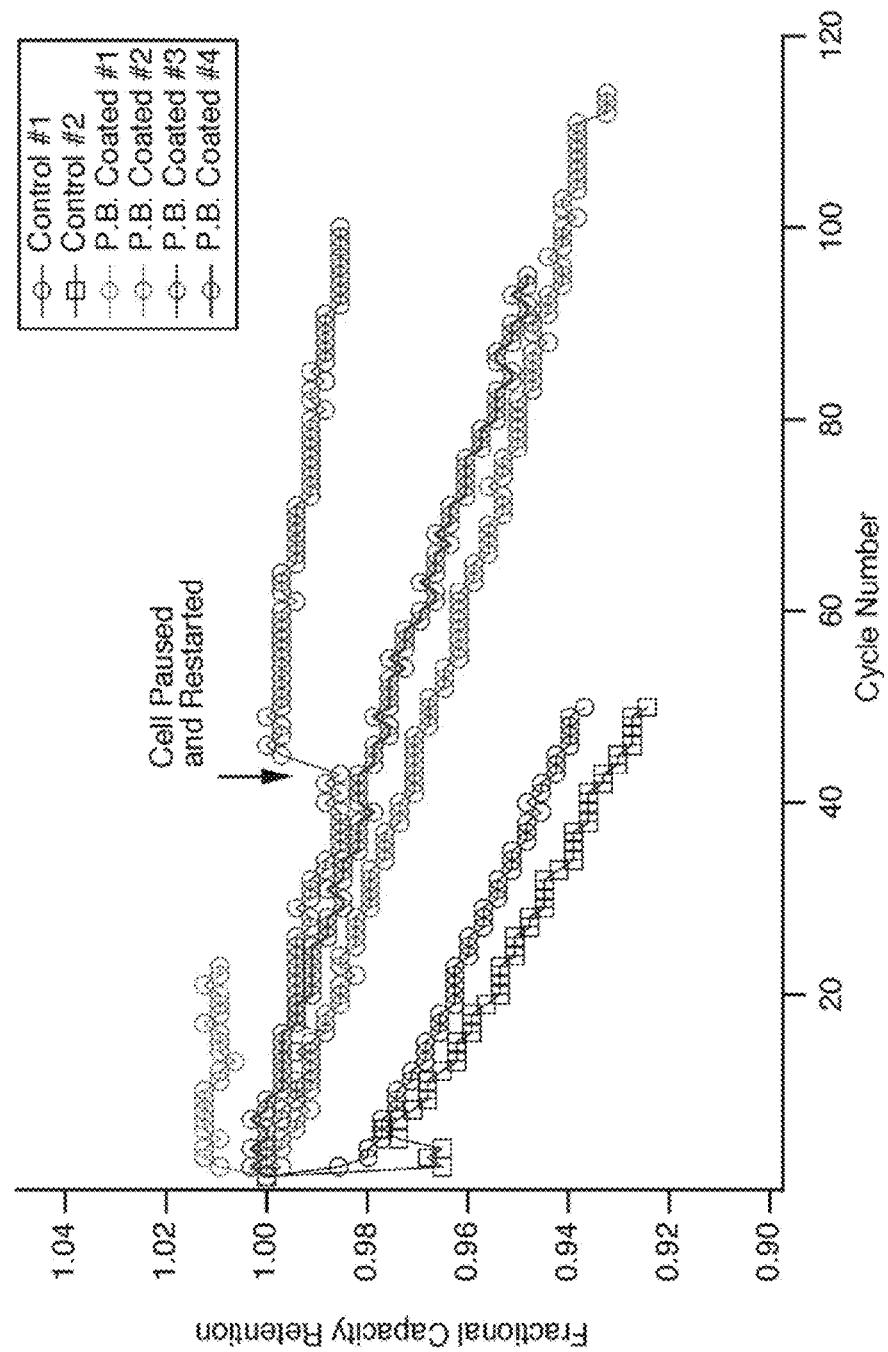
FIG. 12 illustrates a Capacity retention of PB/CuHCF and CuHCF.

FIG. 12 illustrates a Capacity retention of PB/CuHCF and CuHCF. Copper hexacyanoferrate electrodes that have been coated by a thin film of Prussian Blue have improved capacity retention in comparison to uncoated electrodes.

Figure 13:
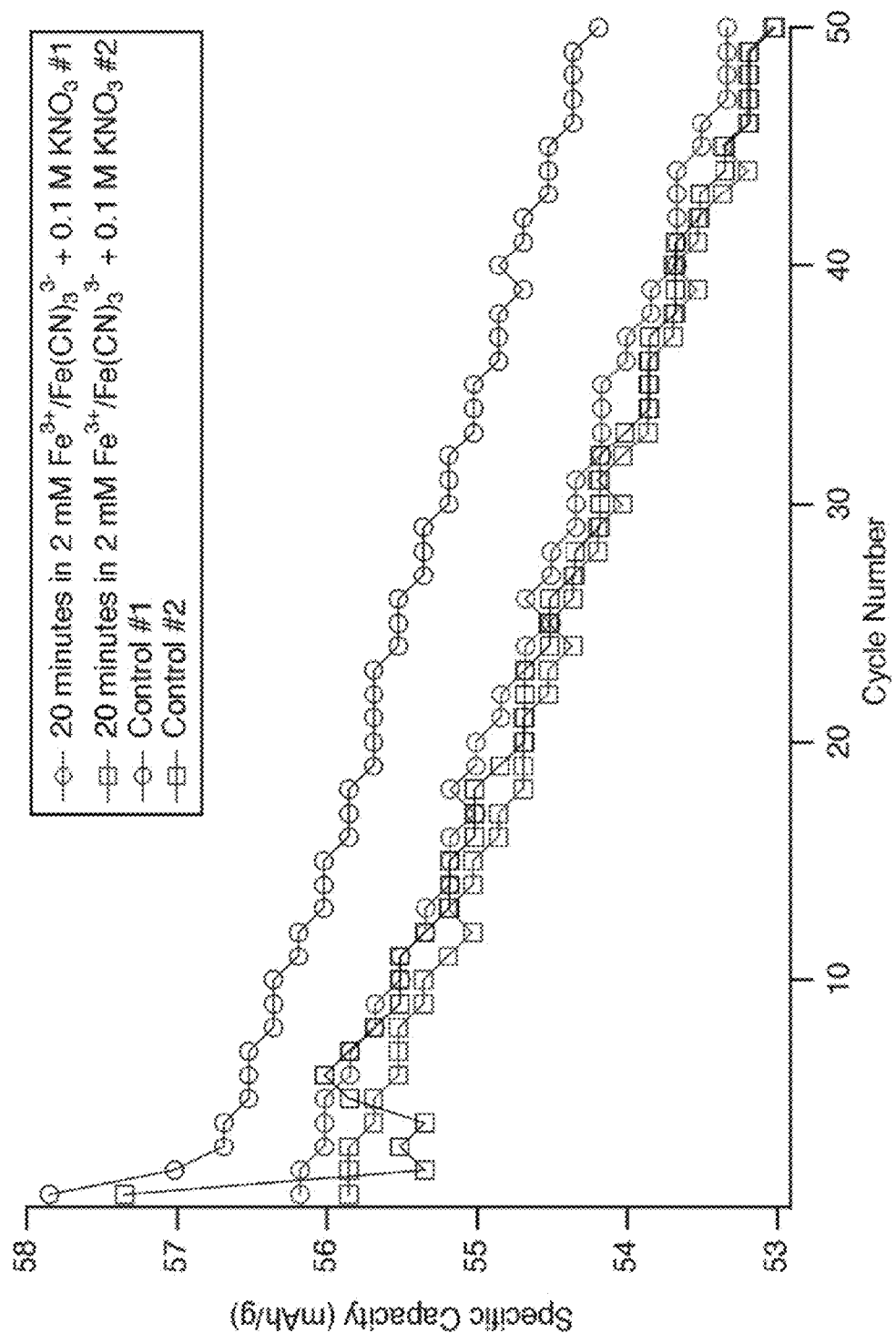
FIG. 13 illustrates a Capacity retention of CuHCF w/K+ in PB dep solution.

FIG. 13 illustrates a Capacity retention of CuHCF w/K+ in PB dep solution. The capacity retention of copper hexacyanoferrate does not improve if the electrodes are exposed to a solution containing both Prussian Blue precursors and a more concentrated potassium salt.

Figure 14:
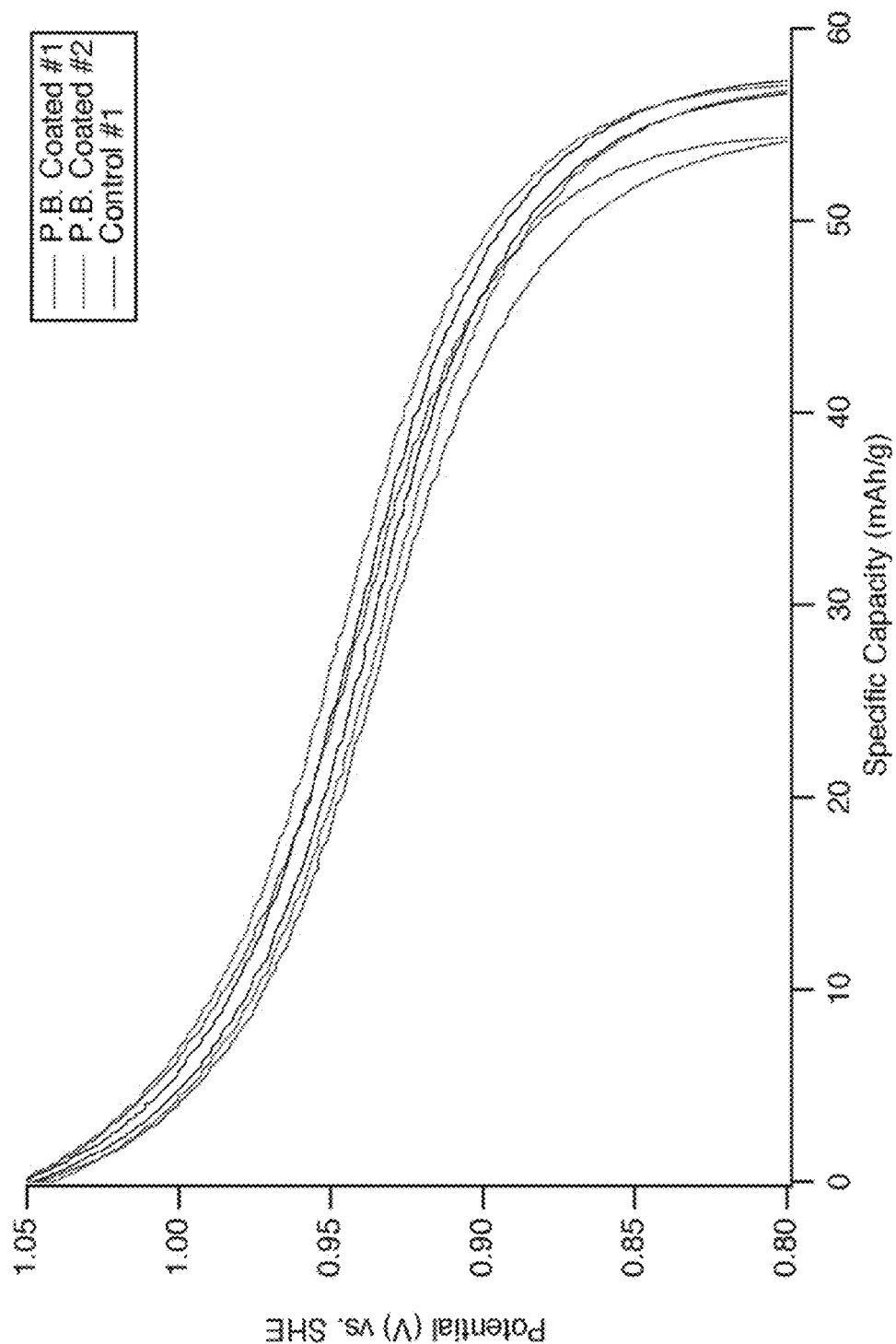
FIG. 14 illustrates a Potential Profiles of CuHCF and Prussian Blue-coated CuHCF electrodes.

FIG. 14 illustrates a Potential Profiles of CuHCF and Prussian Blue-coated CuHCF electrodes. The potential profiles of bare and Prussian Blue-coated copper hexacyanoferrate electrodes. The coating does not have an appreciable effect on the electrochemical behavior of the electrode.

Figure 15:
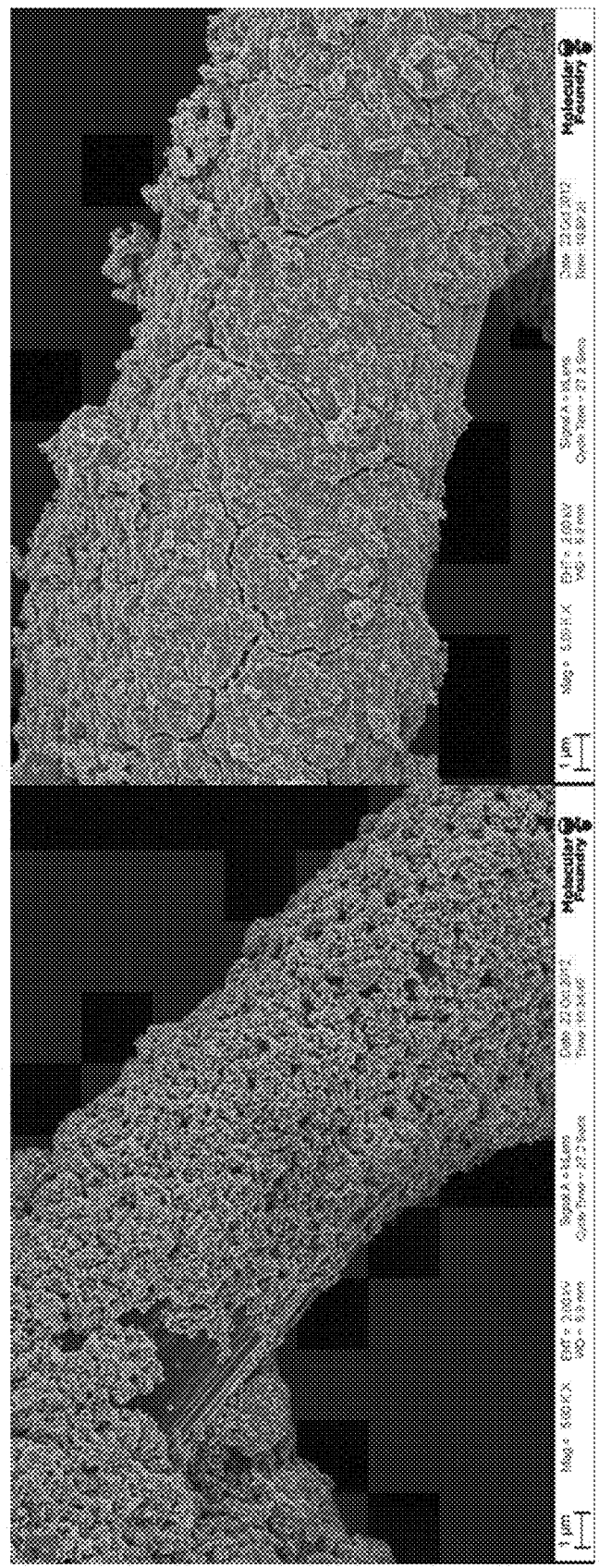
FIG. 15 illustrates a Morphologies of bare and Prussian Blue-coated CuHCF electrodes.

FIG. 15 illustrates morphologies of bare and Prussian Blue-coated CuHCF electrodes in two sub-figures: FIG. 15a) illustrates scanning electron microscopy of a freshly deposited slurry electrode of copper hexacyanoferrate (80%), carbon black (10%), and polyvinylidene difluoride (10%) on a carbon cloth substrate and FIG. 15b) illustrates the same sample, after electrochemical reduction, followed by 40 minutes of exposure to a 2 mM aqueous solution of Fe(CN)3 and K3Fe(CN)6. A film of Prussian Blue has clearly precipitated on the surface of the sample, as the grains at the surface are larger and form a more continuous surface than seen in FIG. 15a).

Figure 16:
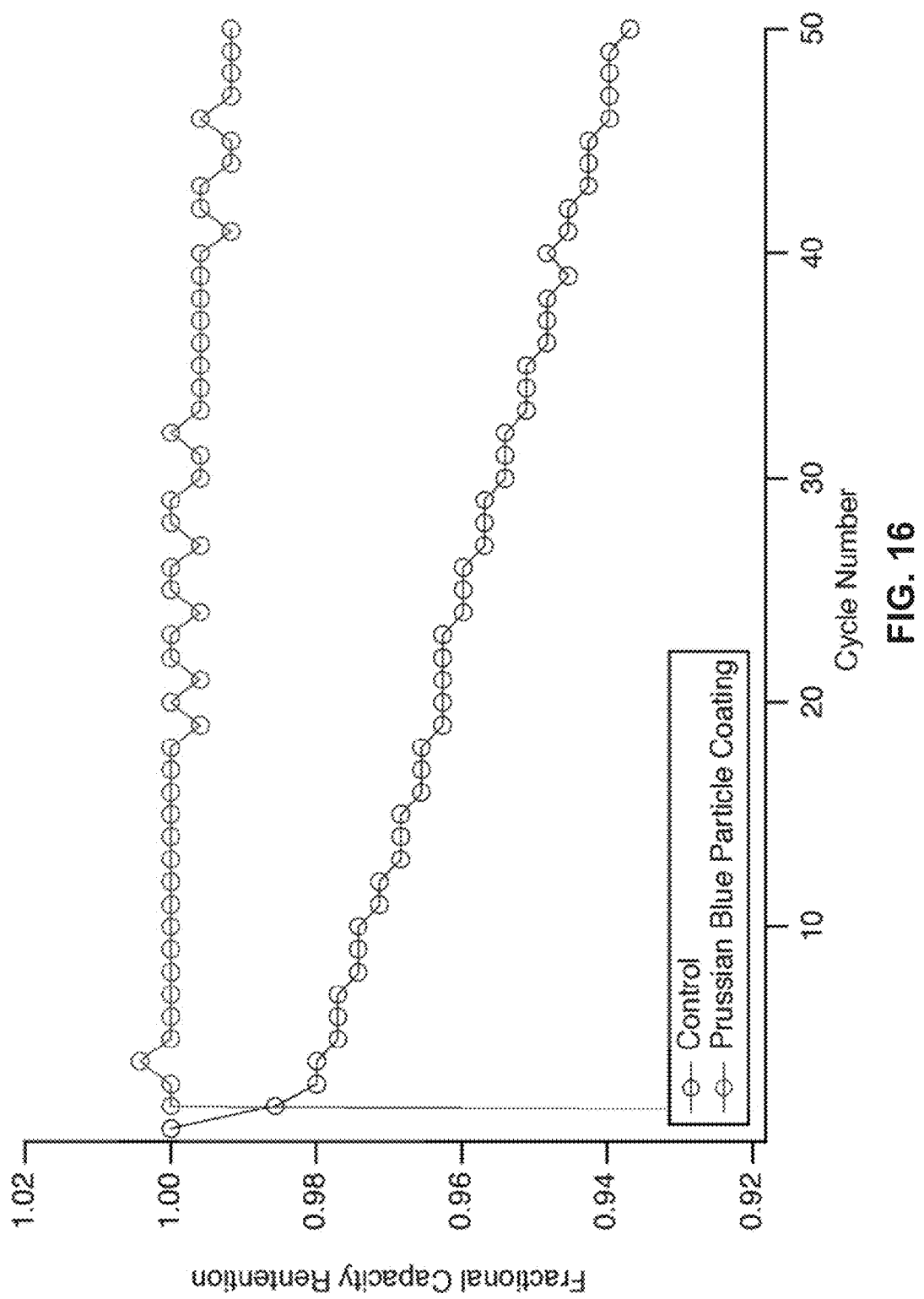
FIG. 16 illustrates a Cycle life of CuHCF with PB coating on the particles.

FIG. 16 illustrates a Cycle life of CuHCF with PB coating on the particles. Fractional capacity retention of a standard copper hexacyanoferrate electrode, and an electrode containing Prussian Blue-coated copper hexacyanoferrate during galvanostatic cycling at a 1C rate in 1 M KNO3 (pH=2). The use of a Prussian Blue coating stabilizes the individual copper hexacyanoferrate particles against dissolution.

Figure 17A:
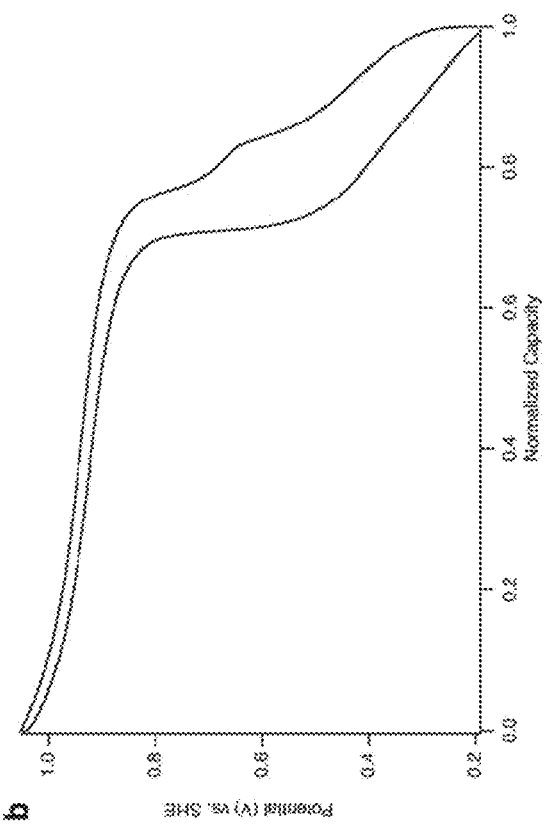
FIG. 17 illustrates a Potential profiles of CuHCF with PB coating on the particles.
Figure 17B:
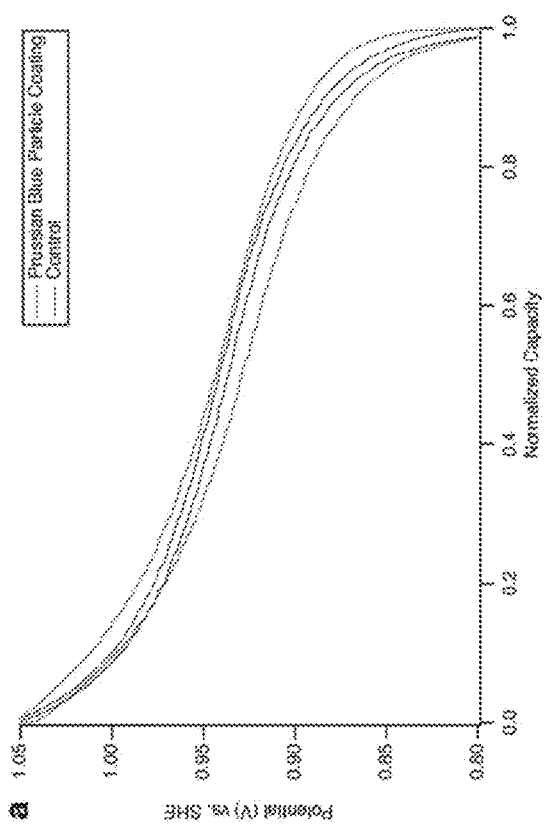

FIG. 17 illustrates Potential profiles of CuHCF with PB coating on the particles in two sub-figures: FIG. 17a illustrates the potential profiles of electrodes containing untreated copper hexacyanoferrate, and copper hexacyanoferrate nanoparticles coated with Prussian Blue, during galvanostatic cycling at a 1C rate in 1 M KNO3 (pH=2) and FIG. 17b illustrates Galvanostatic cycling of an electrode containing Prussian-Blue coated copper hexacyanoferrate nanoparticles over a wider potential range. Prussian Blue is electrochemically active at 0.4 V vs. SHE. About 20% of the total capacity of the electrode occurs at low potential, indicating a ratio of copper hexacyanoferrate to Prussian Blue of about 4:1. This is in agreement with the 4:1 ratio of copper hexacyanoferrate to Prussian Blue precursors added during the coating treatment procedure.

Figure 18:
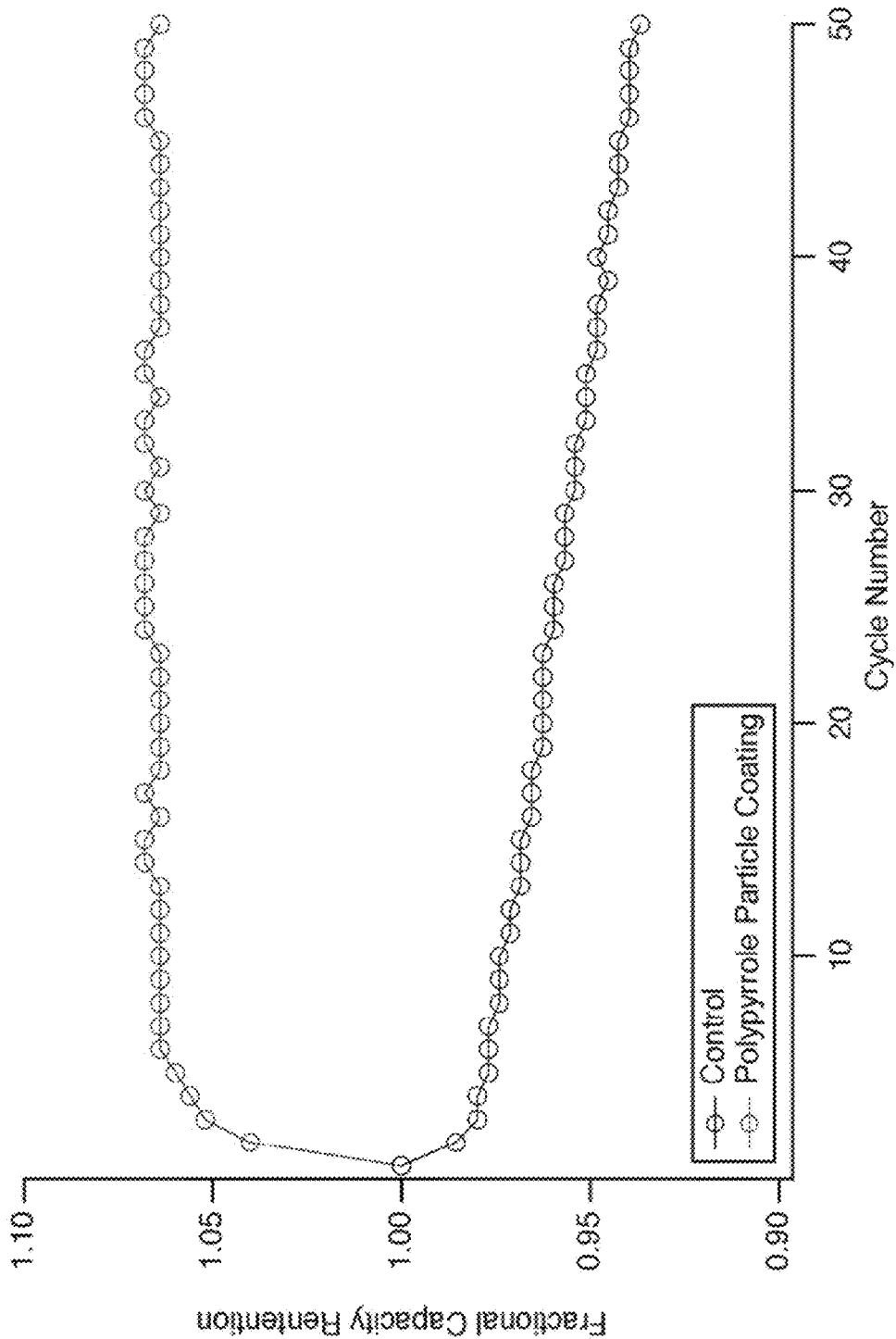
FIG. 18 illustrates a Cycle life of CuHCF with PPy coating on the particles.

FIG. 18 illustrates a Cycle life of CuHCF with PPy coating on the particles. An electrode containing polypyrrole-coated copper hexacyanoferrate shows a completely stable capacity for at least 50 cycles at a 1C rate in 1 M KNO3 (pH=2). In comparison, a control sample containing uncoated copper hexacyanoferrate loses about 7% of its capacity after the same duration of cycling.

Figure 19:
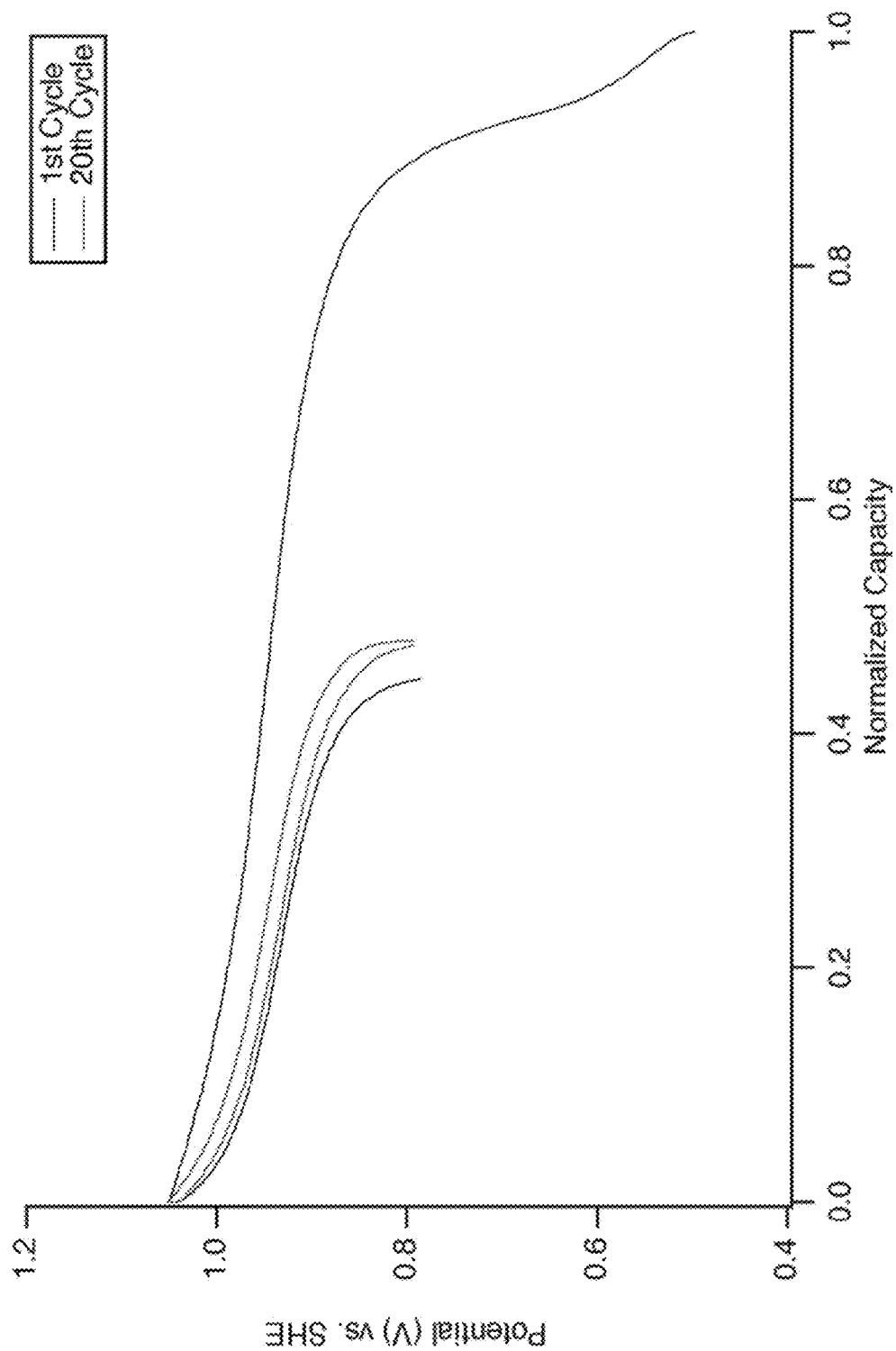
FIG. 19 illustrates a Potential profiles of CuHCF with PPy coating on the particles.

FIG. 19 illustrates a Potential profiles of CuHCF with PPy coating on the particles. A large, irreversible charge capacity is observed during the first charge of polypyrrole-coated copper hexacyanoferrate. Cycling after the first charge is extremely reversible. The reversible reaction centered at 0.95 V vs. SHE is consistent with the one observed for uncoated copper hexacyanoferrate, showing that the polypyrrole coating is inactive in this potential range.

A battery (or cell) comprises an anode, a cathode, and an electrolyte that is in contact with both the anode and the cathode. Both the cathode and the anode contain an electrochemically active material that may undergo a change in valence state, accompanied by the acceptance or release of cations and electrons. For example, during discharge of a battery, electrons are extracted from the anode to an external circuit, while cations are removed from the anode into the electrolyte. Simultaneously, electrons from the external circuit enter the cathode, as do cations from the electrolyte. The difference in the electrochemical potentials of the cathode and anode results in a full cell voltage. This voltage difference allows energy to be extracted from the battery during discharge, or stored in the battery during charge.

Prussian Blue is a well-known material phase of iron cyanide hydrate of the chemical formula $K_xFe^{III}[Fe^{II}(CN)_6]_z \cdot nH_2O$ ($0 \leq x$, $z \leq 1$; $n \approx 4$). This material has been produced industrially for centuries for use as a pigment and dyestuff. It is also a well-known electrochromic material, and has been studied for use as a cathode in electrochromic displays. FIG. 1 illustrates Prussian Blue as having a face-centered cubic crystal structure. In this structure, cyanide bridging ligands link transition metal cations in a spacious open framework. The structure contains large interstitial sites commonly called the "A Sites." Each unit cell contains eight A Sites, each of which may contain zeolitic water, interstitial alkali cations, or both.

For example, copper hexacyanoferrate (CuHCF) is a Prussian Blue analogue recently demonstrated to be a high performance battery electrode. In the open framework structure of CuHCF, iron is six-fold, octahedrally coordinated to the carbon ends of the cyanide branching ligands, while copper is octahedrally nitrogen-coordinated as shown in FIG. 1. Depending on the method of synthesis, the A sites in CuHCF may contain potassium or another alkali cation such as sodium or lithium, or another type of cation such as ammonium. More generally, for a Prussian Blue analogue of the general chemical formula $A_xP_y[R(CN)_6]_z \cdot nH_2O$, alkali cations A+ and water occupy the interstitial A Sites, transition metal P cations are six-fold nitrogen coordinated, and transition metal R cations are six-fold carbon coordinated.

Herein the electrochemical cells used to test electrode properties contained a Prussian Blue analogue working electrode, a counter electrode, an electrolyte in contact with both the anode and cathode, and a Ag/AgCl reference electrode used to independently measure the potentials of the anode and cathode during charge and discharge of the cell. When the electrode of interest was a cathode material, then the working electrode was the cathode, and the counter electrode was the anode. When the electrode of interest was an anode material, then the working electrode was the anode, and the counter electrode was the anode. In the case that the cell did not contain both a Prussian Blue analogue cathode and a Prussian Blue analogue anode, a capacitive activated charcoal counter electrode was used to complete the circuit while allowing the study of a single Prussian Blue analogue electrode.

Several measurement and characterization techniques were used to examine the materials and electrodes described here. Physical characterization of Prussian Blue analogue materials was performed using X-ray diffraction (XRD) and scanning electron microscopy (SEM). Electrochemical characterization of electrodes was performed using galvanostatic cycling with potential limitation (GCPL). During the GCPL technique a constant current is applied to the cell until the working electrode reaches a maximum or minimum potential; upon reaching this extreme potential, the sign of the current is reversed.

In the application, sometimes a shorthand reference is made to a "standard" method for materials synthesis. Those references include this following discussion, sometimes the context includes a modification or adjustment of a portion of this synthesis. CuHCF was synthesized using existing techniques, such disclosed in Wessells, C. D., et al. Copper hexacyanoferrate battery electrodes with long cycle life and high power. *Nature Comm.*, 2, 550 (2011). An aqueous solution of $Cu(NO_3)_2$, and a second aqueous solution of $K_3Fe(CN)_6$ were added to water by simultaneous, dropwise addition while stirring. The final concentrations of the precursors were 40 mM $Cu(NO_3)_2$ and 20 mM $K_3Fe(CN)_6$. A solid, brown precipitate formed immediately. It was filtered or centrifuged, washed, and dried. In a prior study, CuHCF synthesized by this method was found to have the composition $K_{0.7}Cu[Fe(CN)_6]_{0.7} \cdot 2.8H_2O$. FIG. 2 illustrates that CuHCF was found to have the cubic Prussian Blue open framework crystal structure using XRD. The CuHCF was composed of nanoparticles about 50 nm in size, as verified by SEM as shown in FIG. 3.

Manganese hexacyanomanganate (MnHCMn) was synthesized using a single-step procedure such as disclosed in Her, J.-H., et al. Anomalous Non-Prussian Blue Structures and Magnetic Ordering of $K_2Mn^{II}[Mn^{II}(CN)_6]$ and $Rb_2Mn^{II}[Mn^{II}(CN)_6]$. *Inorg. Chem.*, 49, 1524 (2010). A 10 mL aqueous solution containing 0.5 g KCN was slowly added to a 10 mL aqueous solution containing 0.5 g of $MnCl_2$ in a $N_2$ atmosphere. A dark green precipitate slowly formed. This precipitate was centrifuged, washed, and dried with no exposure to air or oxygen. X-ray diffraction of the freshly synthesized material revealed a monoclinic structure indicative of a slight distortion to the standard Prussian Blue open framework structure as shown in FIG. 4. After partial oxidation, the cubic phase was found to form. This result indicates an approximate chemical formula $K_2Mn^{II}[Mn^{II}(CN)_6] \cdot nH_2O$. SEM of FIG. 5 illustrates that the MnHCMn was composed of 1-5 μm agglomerations of 200-1000 nm particles.

Aqueous electrolytes were prepared from reagent-grade salts such as $KNO_3$ or $NaClO_4$ and de-ionized water. These alkali salt electrolytes are typically pH-neutral. For cases in which the electrolytes were acidified, the pH was lowered using $HNO_3$.

Electrodes containing the freshly synthesized Prussian Blue analogues were prepared using various techniques known in the art. The electrochemically active material, carbon black, and polyvinylidene difluoride (PVDF) binder were ground by hand until homogeneous, and then stirred in 1-methyl-2-pyrrolidinone (NMP) solvent for several hours. This slurry was deposited on electronically conductive substrates such as aluminum foil or carbon cloth using a doctor blade or spatula. These electrodes were dried in vacuum or a $N_2$ atmosphere at 60° C.

Activated charcoal counter electrodes were prepared by grinding the charcoal with PVDF before stirring in NMP for several hours, followed by deposition and drying on conductive substrates following the same procedure as in the case of electrodes containing a Prussian Blue analogue.

As a control test, CuHCF electrodes (5 mg CuHCF) were cycled at a 1C rate (one hour charge or discharge) by GCPL between 0.8 and 1.05 V with respect to the standard hydrogen electrode (SHE) in a cell that also contained a Ag/AgCl reference electrode, an activated charcoal counter electrode, and 15 mL of aqueous 1 M $KNO_3$ (pH=2) electrolyte. FIG. 6 illustrates that about 7% capacity loss is observed after 50 cycles.

Electrode Life Extension Method 1: Pm+Electrolyte Additives

The dissolution of a Prussian Blue analogue occurs by the following general process: $APR(CN)_6 \rightarrow A+ + Pm+ + R(CN)_6 n-$ where A is an alkali cation, P and R are transition metal cations, and $n = -1 \cdot (m+1)$. The dissolution process will continue until the saturation limit of the dissolution products is reached. At this chemical equilibrium, the thermodynamic driving force for further dissolution is zero.

The thermodynamic driving force for a chemical process occurring at constant temperature and pressure is the change in the Gibbs Free Energy ($\Delta G$). It is related to the equilibrium constant ($K_{eq}$) of a reaction by the following expression: $\Delta G = -R \cdot T \cdot \ln(K_{eq})$, where R is the ideal gas constant and T is the absolute temperature. The equilibrium constant for the dissolution of a Prussian Blue analogue is the product of the chemical activities of the dissolution products, divided by the chemical activity of solid Prussian Blue analogue: $K_{eq} = (a_A \cdot a_P \cdot a_{R(CN)_6})/a_{APR(CN)_6}$ where $a_i$ is the chemical activity of the ith species. As $\Delta G = 0$ and R and T are nonzero constants, $K_{eq} = 1$, and therefore, $(a_A \cdot a_P \cdot a_{R(CN)_6})/a_{APR(CN)_6} = 1$ as well. In most conditions, the chemical activity of a species can be approximated by the concentration of that species, so $c_A \cdot c_P \cdot c_{R(CN)_6}/c_{APR(CN)_6} = 1$, where $c_i$ is the concentration of the ith species.

As $c_A \cdot c_P \cdot c_{R(CN)_6}/c_{APR(CN)_6} = 1$, the introduction of an additional quantity of one or more species A+, Pm+, or R(CN)6n− to the system must result in the precipitation of $APR(CN)_6$ from dissolved A+, Pm+, or R(CN)6n− until the equilibrium constant $K_{eq} = c_A \cdot c_P \cdot c_{R(CN)_6}/c_{APR(CN)_6}$ is again equal to one. For example, the dissolution of the CuHCF cathode is described by the following expression: $KCuFe(CN)_6 = K+ + Cu^{2+} + Fe(CN)_6^{3-}$, and the corresponding equilibrium constant is $K_{eq} = (c_K \cdot c_{Cu} \cdot c_{Fe(CN)_6})/c_{CuHCF} = 1$. Therefore, CuHCF will be less soluble in a concentrated K+ electrolyte than in pure water, as a higher $c_K$ must result in lower equilibrium $c_{Cu}$ and $c_{Fe(CN)_6}$. FIG. 7 illustrates confirmation of this result by measurement of the dissolved ferricyanide concentration ($c_{Fe(CN)_6}$) in either pure water or 1 M $KNO_3$ (pH=2) by ultraviolet-visible (UV-vis) absorption spectroscopy.

Following the same principle, the addition of either Pm+ or R(CN)6n− to the electrolyte will also shift the chemical equilibrium to favor less dissolution of the solid $APR(CN)_6$ phase. In the case of the CuHCF cathode with a $Cu^{2+}$ electrolyte additive, this result has been confirmed by both UV-vis spectroscopy and by electrochemical testing of electrodes as illustrated in FIG. 8 and FIG. 9.

The same principles are valid for the case of the MnHCMn anode. This material hydrolyzes rapidly in pure water or dilute alkali salt solutions. However, it is much more stable, and therefore capable of reversible electrochemical cycling, in concentrated alkali salt solutions such as saturated sodium perchlorate. Furthermore, enhanced stability is observed upon the addition of Mn2+ to the electrolyte. A similar effect can also be achieved by the addition of CN- anions to the electrolyte, as their presence shifts the equilibrium towards MnHCMn, and away from a hydrolyzed product and dissolved CN-anions. These results for the stabilization of the MnHCMn anode, in combination with those for the CuHCF cathode demonstrate that the general concept of a P2+ electrolyte additive to enhance the stability of a Prussian Blue analogue applies to both anodes and cathodes.

Electrode Life Extension Method 2: Combination of P2+ Electrolyte Additive with P Metal Anode In most previous studies of Prussian Blue analogue battery electrodes, another Prussian Blue analogue or a capacitive carbon counter electrode was chosen. In a 1983 patent, Itaya et al briefly describe the use of a Prussian Blue analogue cathode in combination with a metallic zinc anode in an aqueous NH4Cl electrolyte. Metallic anodes operate by dissolution during oxidation (discharge) and by electroplating of the metal from cations in solution during reduction (charge).

The choice of a metallic anode P for use in an electrolyte containing a Pm+ additive and a Prussian Blue analogue cathode of the general formula APR(CN)6 is advantageous for at least two reasons. First, the presence of Pm+ in the electrolyte stabilizes the Prussian Blue analogue cathode against dissolution. Second, the initial presence of Pm+ in the electrolyte allows the battery to start in a discharged state. Without the addition of Pm+ to the electrolyte, no electrodeposition can occur at the anode.

FIG. 10 illustrates GCPL of the CuHCF cathode against a metallic Cu anode in an electrolyte containing 100 mM Cu(NO3)2. Analogous systems include, but are not limited to nickel hexacyanoferrate/Ni2+/Ni and zinc hexacyanoferrate/Zn2+/Zn. Furthermore, the Pm+/P anode system need not match the transition metal cation found in the Prussian Blue analogue cathode. For example, the CuHCF cathode could be operated in an electrolyte containing Zn2+ and a Zn metal anode.

Electrode Life Extension Method 3: Electroless Deposition of Prussian Blue Analogue Coatings An obvious method for the stabilization of Prussian Blue analogue electrodes against dissolution is the use of a conformal coating that limits prevents their contact with water. However, for an electrode with a coating layer to be useful, the coating must be conductive to alkali cations such as Na+ and K+, or it will prevent the charge and discharge of the Prussian Blue analogue. Few materials systems are capable of rapid Na+ or K+ conduction at room temperature.

Regular Prussian Blue is much less soluble than many of its analogues. Also, reduced Prussian Blue analogues have been observed to be less soluble than oxidized ones. In addition, electrochemical oxidation of mixed-valent KFeIIIFeII(CN)6 to Berlin Green (FeIIIFeIII(CN)6) occurs at a higher potential than the analogous oxidation of Prussian Blue analogue cathodes such as CuHCF. Therefore, if a CuHCF electrode is coated with a thin, conformal film of reduced, insoluble Prussian Blue, the CuHCF electrode may undergo electrochemical cycling as usual. If the Prussian Blue coating is continuous and conformal, the CuHCF electrode will not dissolve; however, the high ionic conductivity of Prussian Blue allows the electrode to still operate at high rates.

Because the oxidation potential of Prussian Blue to Berlin Green is higher than the oxidation potential of CuHCF, a film of Prussian Blue can be easily deposited onto CuHCF by an electroless reductive precipitation method.

The reduction of Berlin Green to Prussian Blue is analogous to the reduction of the CuHCF cathode, as in each case, carbon-coordinated iron in the framework crystal structure is reduced from Fe3+ to Fe2+. Unlike Prussian Blue, fully oxidized Berlin Green is sparingly soluble, so dilute solutions of Fe3+ and Fe(CN)63− can be readily prepared. Electroless deposition of Prussian Blue onto a low-potential electrode (such as CuHCF) will occur from a dilute solution containing Fe3+ and Fe(CN)63− if that electrode has a potential below that of the reduction of Fe3+ to Fe2+ (V0=0.771 V vs. SHE). In the case of a CuHCF electrode, this occurs by the following two-step mechanism:

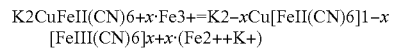

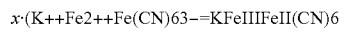

It is reasonable to expect the reduction of Fe3+ results in the formation of a thin film of Prussian Blue on the surface of the CuHCF electrode, as there is widespread precedent for the electrodeposition of Prussian Blue films by the same mechanism: reduction of iron cations, and subsequent Prussian Blue precipitation, from a dilute aqueous solution of Fe3+ and Fe(CN)63+.

The oxidation of Prussian Blue to Berlin Green occurs at a higher potential than the reaction potential of CuHCF (FIG. 11). This means that CuHCF electrodes in electrical contact with Prussian Blue can be cycled without oxidizing the Prussian Blue to the more soluble Berlin Green. Therefore, a conformal coating of insoluble Prussian Blue prevents the slow dissolution of CuHCF electrodes.

This technique offers several advantages: electroless deposition of Prussian Blue is fast and inexpensive; alkali ion transport in Prussian Blue is extremely rapid; and the same technique could be used to stabilize Prussian Blue analogue anodes (in fact, it could be used on any electrode family).

Methods:
  1 cm2 slurry electrodes containing 5 mg of CuHCF were prepared using the standard methods described herein.
  An aqueous deposition solution of 2 mM Fe(NO3)3 and 2 mM K3Fe(CN)6 was prepared.
  As-synthesized CuHCF has an open circuit potential near 1.05 V vs. SHE, too high for electroless deposition of Prussian Blue from Fe3+ and Fe(CN)63−. Thus, a preparative electrochemical reduction to 0.7 V was performed by galvanostatic discharge at a 1C rate in 1 M KNO3 (pH=2).
  The discharged CuHCF electrodes were washed, dried, and then placed in 10 mL of the deposition solution for 30 minutes. They were then washed, dried, and inserted into batteries for testing.
  Though the fresh electrodes were black (due to the carbon in the slurry), after exposure to the deposition, the electrodes appeared slightly bluish.
  The CuHCF electrodes were cycled at 1C between 0.8 and 1.05 V against a Ag/AgCl reference electrode and an activated charcoal counter electrode in 15 mL of 1 M KNO3 (pH=2).

Before exposure to the deposition solution, CuHCF electrodes were discharged to 0.7 V vs. SHE. After deposition of the Prussian Blue coating for 30 minutes, their open circuit potential was found to be 0.85 V vs. SHE. From the previously reported galvanostatic potential profile of CuHCF (FIG. 2) this corresponds to a charge fraction of about 5% for the CuHCF, or 3 mAh/g based on its specific capacity of 60 mAh/g. As each sample contained 5 mg CuHCF, the total charge expended during Prussian Blue deposition was 15 μAh. From the 10.16 Å lattice parameter of Prussian Blue and the planar geometric area of the electrode, this total charge corresponds to the deposition of a film with a thickness of 1.1 μm. However, as the electrode is extremely rough with a larger true surface area than its planar one, a true Prussian Blue coating thickness of ~500 nm is reasonable.

The deposition of a Prussian Blue coating consistently improved the capacity retention of the CuHCF electrode. The fractional capacity retention of two control samples and four samples with Prussian Blue coatings is shown in FIG. 12. The improvement of CuHCF capacity retention is reproducibly achieved using the Prussian Blue coating step. Improving the completeness of the coverage of the conformal Prussian Blue coating through optimization of the coating procedure will further improve the magnitude and reliability of the stabilizing effect of the coating layer.

In some publications in which thin films of Prussian Blue are electrodeposited, a supporting electrolyte such as 0.1 M KCl or K2SO4 is used.15 This aids electrodeposition, as the ionic conductivity of the solution is much higher in the presence of a more concentrated salt. To determine whether or not a supporting electrolyte enhances the electroless deposition of Prussian Blue coatings on CuHCF electrodes, the coating step was performed in the same 2 mM Fe3+/Fe (CN)63− solution, with 0.1 M KNO3 added. At the end of the coating step, the electrodes were washed and dried. Their color remained black, and did not show evidence of a bluish tint. As shown in FIG. 3, there is no improvement in the capacity retention.

FIG. 13 illustrates that the presence of excess K+ in the deposition solution prevents the rapid growth of the Prussian Blue film on CuHCF. This result can be qualitatively explained be the presence of K+ on the right side of the first step of the deposition mechanism. The presence of excess K+ shifts the equilibrium to the left side, so the CuHCF would have to be reduced to a lower open circuit potential to reduce Fe3+ to Fe2+ in the presence of excess K+.

Finally, the effect of the Prussian Blue coating step on the potential profile of the CuHCF electrode was examined. As shown in FIG. 14, there is no discernible difference between the shapes of potential profiles of samples treated with the deposition solution and fresh control samples.

The morphologies of bare and Prussian Blue-coated CuHCF electrodes were examined using SEM (FIG. 15). The fresh sample is composed of easily distinguished individual nanoparticles. However, the coated sample is composed of nanoparticles that are bound together by a continuous coating layer. Exposure of the CuHCF electrode to the deposition solution results in the formation of a conformal thin film of Prussian Blue. This film is directly responsible for improved electrode lifetime during battery operation because it acts as a barrier to CuHCF dissolution. Further characterization of this film will be the subject of future work.

Electrode Life Extension Method 4: Combination of Prussian Blue Analogue Coating with P2+ Electrolyte Additives The method for electrode stabilization described in electroless deposition of Prussian Blue Analogue Coatings is now generalized. Other analogues besides Prussian Blue itself may be used as a protective coating against dissolution for another Prussian Blue analogue, and a protective coating of the formula APR(CN)6 may be used in combination with a Pm+ electrolyte additives and a P metal anode.

When the reduction potential of the APR(CN)6 coating is higher than the oxidation potential of the Prussian Blue analogue to be protected, then the same electroless deposition procedure as in the case of a Prussian Blue coating can be used. For example, nickel hexacyanoferrate (NiHCF) has a lower reaction potential than zinc hexacyanoferrate (ZnHCF). Electroless deposition of a conformal film of ZnHCF onto a NiHCF electrode will occur spontaneously if that electrode is placed in a solution containing Zn2+ and Fe(CN)63−:

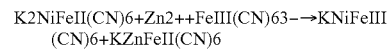

Or, in the case of materials not containing excess potassium in the A sites in their structures:

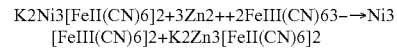

This reaction occurs spontaneously because ZnHCF and other Prussian Blue analogues are less soluble when reduced than when oxidized. Therefore, for this reaction to yield a conformal thin film on the electrode, but not the additional spontaneous precipitation of oxidized ZnHCF particles, the concentrations of the Zn2+ and FeIII(CN)63− precursors must be greater than the saturation limit of reduced ZnHCF, but lower than the saturation limit of oxidized ZnHCF. Or, more generally, the spontaneous precipitation of a Al+xPR (CN)6 film with a high reduction potential onto a Prussian Blue analogue electrode with a lower reduction potential will occur if the precursors Pm+ and R(CN)6n− are present in concentrations greater than the saturation limit of reduced Al+xPR(CN)6, but lower than the saturation limit of oxidized AxPR(CN)6.

The use of a Prussian Blue coating can be used in combination with a Fe electrolyte additive, but it is by the reduction potential of aqueous Fe3+ to Fe2+ at 0.771 V. To avoid reversibly oxidizing and reducing the Fe in the electrolyte, the potentials of the cathode and anode must both remain below 0.771 V. For Prussian Blue analogue cathodes with reaction potentials higher than this, a different coating must be chosen. For example, a coating of ZnHCF can be combined with a Zn2+ electrolyte additive because Zn2+ cannot be oxidized further in aqueous solutions. Furthermore, as the Zn2+ electrolyte additive can be paired with a metallic Zn anode, a general cell of the following form can also be constructed: A Prussian Blue analogue cathode of the general formula APR(CN)6, coated by another Prussian Blue analogue of the general chemical formula AP'R'(CN)6, with an electrolyte additive P'm+ and a metallic anode P'. Combinations include a ZnHCF coating/Zn2+ electrolyte additive/Zn metal anode and a NiHCF coating/Ni2+ electrolyte additive/Ni metal anode. Furthermore, a ZnHCF cathode or ZnHCF-coated cathode could be paired with a Zn2+ electrolyte additive and a galvanized steel anode, as the zinc in the galvanized surface layer would provide an adequate charge capacity.

Electrode Life Extension Method 5: Coating of individual Prussian Blue Analogue Particles with a Prussian Blue Analogue Shell A protective coating of insoluble Prussian Blue or a Prussian Blue analogue can be applied not only to entire electrodes, but to the individual particles that compose the electrode. In one prior case, unrelated to the use of Prussian Blue analogues as battery electrodes, nanoparticles of a Prussian Blue analogue were coated with a conformal shell of another Prussian Blue analogue. The advantage of this method of electrode stabilization is that if performed correctly, every particle of electrochemically active material has a conformal shell that prevents its dissolution. However, a larger total mass of protective layer is needed because of the larger surface area.

Copper hexacyanoferrate was synthesized as described herein. Sodium thiosulfate ($Na_2S_2O_3$), a reducing agent, was added by dropwise to the solution containing the CuHCF nanoparticles 15 minutes after their initial precipitation. The $Na_2S_2O_3$ was added in a 0.8:1 molar ratio to the potassium hexacyanoferrate precursor used to make the CuHCF. During this process, the color of the solution changed from brown to purple. The low oxidation potential of $Na_2S_2O_3$ results in the reduction of the CuHCF nanoparticles. After this chemical reduction step, the electrochemical potential of the CuHCF was below 0.771 V, low enough to spontaneously reduce $Fe^{3+}$ to $Fe^{2+}$.

The chemically reduced CuHCF was centrifuged and washed with water to remove excess $Cu^{2+}$ left over from its precipitation. It was then redispersed in pure water by sonication. Finally, by dropwise addition, a Prussian Blue deposition solution of 10 mM $Fe(NO_3)_3$ and 10 mM $K_3Fe(CN)_6$ was added to the solution of reduced CuHCF particles. This solution was slowly added until the molar ratio of the $Fe(NO_3)_3$ and $K_3Fe(CN)_6$ to the hexacyanoferrate in the CuHCF reached 1:4. The solution changed color from purple to dark blue, indicating that the $Fe^{3+}$ was reduced to $Fe^{2+}$, and that the $Fe^{2+}$ then reacted with the $Fe(CN)_6^{3-}$ to form Prussian Blue. This process is analogous to the reduction of iron that occurs during the exposure of electrodes containing CuHCF to the Prussian Blue deposition solution described herein. The rest of the electrode preparation method was the same as described above.

The reduction by thiosulfate is necessary only because the CuHCF was synthesized in a fully oxidized state, and its potential was too high to reduce the $Fe^{3+}$ to $Fe^{2+}$. In the case that some other Prussian Blue analogue is chosen to be the coating layer (for example, to be paired with a $P^{2+}$ electrolyte additive and a P metal anode), then the chemical reduction step of the electrode nanoparticles may not be necessary, as described in the discussion of a combination of Prussian Blue analogue coating with $P^{2+}$ electrolyte additives for the case of a NiHCF electrode and a ZnHCF coating.

As shown in FIG. 16, an electrode containing CuHCF particles coated with Prussian Blue lost less than 1% of its capacity after 50 galvanostatic cycles at a 1C rate. In comparison, an electrode containing uncoated CuHCF particles lost about 7% of its capacity after the same duration of cycling. This result conclusively demonstrates that the coating of individual particles with Prussian Blue results protects them from dissolution in the battery electrolyte.

The performance of the CuHCF electrode is similar with and without a conformal Prussian Blue coating of the individual particles. As shown in FIG. 17, the potential profiles of electrodes containing bare and coated particles are similar (FIG. 17a).

Prussian Blue can be electrochemically reduced near 0.4 V vs. SHE. The Prussian Blue coating is electrochemically active at low potential (FIG. 17b), confirming that the coating treatment indeed resulted in the successful deposition of Prussian Blue coating. The ratio of the observed capacities of CuHCF to Prussian Blue is about 4:1 between 0.2 and 1.05 V vs. SHE. This is consistent with the 4:1 molar ratio of CuHCF to Prussian Blue precursors present during the coating procedure.

Electrode Life Extension Method 6: Coating of Prussian Blue Analogue Particles with Polymer Coatings by Redox Deposition Other coatings besides Prussian Blue analogues may be used to protect a Prussian Blue analogue battery electrode (or its constituent particles) from dissolution. Such a coating material must be conductive to cations such as $Na^+$ or $K^+$ so that the electrode can be charged and discharged, and it should not be significantly soluble in aqueous electrolytes. If it has non-negligible solubility in aqueous electrolytes, then its dissolution products must be electrochemically inactive in the potential window of the anode and cathode of the battery.

A variety of mixed conducting polymers including polypyrroles and polythiophenes are known to intercalate cations such as $Na^+$. They are insoluble in aqueous electrolytes. Therefore, a conformal polymer coating can protect a Prussian Blue analogue electrode from dissolution.

For example, CuHCF was synthesized by the standard method described herein. Pyrrole was then added by slow, dropwise addition to the solution in a 1:2 mass ratio with respect to the CuHCF already present. The solution immediately turned black, as the pyrrole was oxidized to polypyrrole upon contact with the CuHCF nanoparticles. The rest of the electrode preparation method was the same as the standard method.

The use of a polypyrrole coating stabilizes the CuHCF against dissolution in the battery electrolyte. As shown in FIG. 18, the capacity of an electrode containing polypyrrole-coated CuHCF nanoparticles is completely stable for 50 galvanostatic cycles at a 1C rate in 1 M $KNO_3$ (pH=2). In comparison, a control electrode containing untreated CuHCF loses about 7% of its capacity during cycling under the same conditions.

The initial charge of polypyrrole-coated CuHCF shows a large, irreversible capacity. However, the electrode is completely stable in charge and discharge after the first few cycles. Little difference is observed between the first discharge and the charge and discharge during the 20th cycle as illustrated in FIG. 19.

Other Stabilization Methods:

Below are described several additional methods for the stabilization of Prussian Blue analogues against dissolution, and therefore, the extension of the operational life of Prussian Blue analogue electrodes.

Complexation with amines: a variety of amines have been shown to form strong complexes with hexacyanoferrate, and therefore, can coordinate strongly to the surface of a Prussian Blue analogue particle to form a protective layer. These include simple diamines such as ethylene diamine, and larger aromatic amines such as Nile Blue. Furthermore, oxides of cyclic amines such as pyridine-n-oxide can be used to coat Prussian Blue analogue particles. Addition of one or more of these amines during the synthesis of the Prussian Blue analogue, or as an electrolyte additive, will result in a conformal surface coating layer that stabilizes the Prussian Blue analogue against dissolution.

Anions of insoluble $P^{2+}$ salts: soluble or trace-soluble alkali cation salts such as sodium fluoride, carbonate, or oxalate can be added during the synthesis of a Prussian Blue analogue, or as an electrolyte additive. During the dissolution of a Prussian Blue analogue, the $P^{m+}$ cation hydrates and leaves the surface of the particle to enter the aqueous solution. Transition metal salts of anions such as fluoride, carbonate, oxalate, and others are insoluble, and therefore, will react with the Pm+ at the surface of the Prussian Blue analogue particle to form an insoluble coating layer.

Thin films of insoluble transition metal sulfides such as CdS, Cu2S, MnS, and ZnS are commonly fabricated for semiconductor devices including photodiodes. Deposition of these films from aqueous solution can be easily accomplished by reaction of a transition metal cation Pm+ with a sulfide precursor such as thiourea, thiosulfate, or sodium sulfide. Many transition metal sulfides are good sodium ion conductors, so a metal sulfide coating of a Prussian Blue analogue will protect it against dissolution while still allowing it to react electrochemically. These metal sulfides are unstable against hydrolysis at high potentials, and are most fit for use on Prussian Blue analogue anodes with reaction potentials near or below SHE.

Similarly, small molecules containing thiol groups can coordinate to the transition metal cations Pm+ on the surface of a Prussian Blue analogue particle. Examples include simple thiols such as decanethiol, and more complicated molecules such as cysteine.

Additionally, extremely thin (5-10 nm) conformal layers of metal oxides such as Al2O3, SiO2, and TiO2 can be readily grown on the surfaces of Prussian Blue analogue nanoparticles using a sol-gel decomposition process from organometallic precursors. For example, in the case of SiO2, the slow addition of dilute tetraethyl orthosilicate (silicon tetraethoxide) to the aqueous solution containing newly synthesized Prussian Blue analogue particles will result in the hydrolysis as polymerization of SiO2 nanoparticles, which form a thin, continuous film on the surface of the Prussian Blue analogue particle. These oxides are completely insoluble in water, so they provide a robust barrier to dissolution of the Prussian Blue analogue. In addition, as they are extremely thin, and in some cases (such as Al2O3) have good Na+ conductivity, they do not strongly limit the transport of alkali cations in and out of the Prussian Blue analogue during electrochemical cycling.

The following references provide background information that may assist the reader in understanding some of the context of the discussion herein. These references are hereby expressly incorporated by reference in their entireties for all purposes:

1. Rastler, D. Electricity Energy Storage Technology Options, Electric Power Research Institute, 1020676 (2010).
2. Wessells, C. D., et al. Copper hexacyanoferrate battery electrodes with long cycle life and high power. Nature Comm., 2, 550 (2011).
3. Wessells, C. D., et al. Nickel Hexacyanoferrate Nanoparticle Electrodes for Aqueous Sodium and Potassium Ion Batteries. Nano Lett., 11, 5421 (2011).
4. Wessells, C. D., et al. The Effect of Insertion Species on Nanostructured Open Framework Hexacyanoferrate Battery Electrodes. J. Electrochem. Soc., 159, A98 (2012).
5. Wessells, C. D., et al. Tunable Reaction Potentials in Open Framework Nanoparticle Battery Electrodes for Grid-Scale Energy Storage. ACS Nano, 6, 1688 (2012).
6. Pasta, M., et al. A high-rate and long cycle life aqueous electrolyte battery for grid-scale energy storage. Nature Comm., 3, 1149 (2012).
7. Bellomo, A. Formation of Copper(II), Zinc(I), Silver(I), and Lead(II) Ferrocyanides. Talanta, 17, 1109 (1970).
8. Zadronecki, M., et al. High Affinity of Thallium Ions to Copper Hexacyanoferrate Films. J. Electrochem. Soc., 148, E348 (2001).
9. Soto, M. B., et al. The thermodynamics of the insertion electrochemistry of solid metal hexacyanometallates. J. Electroanal. Chem., 521, 183 (2002).
10. Robin, M. B., The Color and Electronic Configurations of Prussian Blue. Inorg. Chem., 1, 337 (1962).
11. Itaya, K., et al. Electrochemistry of Polynuclear Transition Metal Cyanides: Prussian Blue and Its Analogues. Acc. Chem. Res., 19, 162 (1986).
12. Buser, H. J., et al. The Crystal Structure of Prussian Blue: Fe4[Fe(CN)6]3.xH2O. Inorg. Chem., 16, 2704 (1977).
13. Her, J.-H., et al. Anomalous Non-Prussian Blue Structures and Magnetic Ordering of K2MnII[MnII(CN)6] and Rb2MnII[MnII(CN)6]. Inorg. Chem., 49, 1524 (2010).
14. Itaya, K., et al. European Patent Application EP 0086555A1 (Jan. 13, 1983).
15. Stilwell, D. E., et al. Electrochemical studies of the factors influencing the cycle stability of Prussian Blue films. J. Appl. Electrochem., 22, 325 (1992).
16. Catala, L., et al. Core-Multishell Magnetic Coordination Nanoparticles: Toward Multifunctionality on the Nanoscale. Angew. Chem. Int. Ed., 121, 189 (2009).

The system and methods above has been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Herein the term "size" refers to a characteristic dimension of an object. Thus, for example, a size of an object that is spherical can refer to a diameter of the object. In the case of an object that is non-spherical, a size of the non-spherical object can refer to a diameter of a corresponding spherical object, where the corresponding spherical object exhibits or has a particular set of derivable or measurable properties that are substantially the same as those of the non-spherical object. Thus, for example, a size of a non-spherical object can refer to a diameter of a corresponding spherical object that exhibits light scattering or other properties that are substantially the same as those of the non-spherical object. Alternatively, or in conjunction, a size of a non-spherical object can refer to an average of various orthogonal dimensions of the object. Thus, for example, a size of an object that is a spheroidal can refer to an average of a major axis and a minor axis of the object. When referring to a set of objects as having a particular size, it is contemplated that the objects can have a distribution of sizes around the particular size. Thus, as used herein, a size of a set of objects can refer to a typical size of a distribution of sizes, such as an average size, a median size, or a peak size.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. An electrochemical apparatus, comprising:
   an aqueous electrolyte having a plurality of ions;
   a first electrode disposed in said aqueous electrolyte, said first electrode including a first Prussian Blue analogue material having a general chemical formula $A_xP_y[R(CN)_{6-j}L_j]_z \cdot nH_2O$, where: A is a cation, P is a metal cation, R is a transition metal cation, and L is a ligand substitutable in the place of a CN$^-$ ligand, and $0 \leq j \leq 6$, $0 \leq x \leq 2$, $0 < y \leq 4$, $0 < z \leq 1$, and $0 \leq n \leq 5$ wherein said first Prussian Blue analogue material has a first specific chemical formula conforming to said general chemical formula including a first particular cation $P_1$ and a first particular cation $R_1$ and wherein said first Prussian Blue analogue material has a first rate of electrochemical capacity loss when disposed in said aqueous electrolyte;
   a first conformal polymer layer disposed on said first electrode, said first conformal polymer layer conductive to said plurality of ions;
   wherein said first electrode with said first conformal polymer layer has a second rate of electrochemical loss less than said first rate of electrochemical capacity loss when said first electrode is disposed in said aqueous electrolyte;
   a second electrode disposed in said aqueous electrolyte, said second electrode including a second Prussian Blue analogue material having said general chemical formula wherein said second Prussian Blue analogue material has a second specific chemical formula conforming to said general chemical formula different from said first specific chemical formula, and wherein said second Prussian Blue analogue material has a third rate of electrochemical capacity loss when disposed in said aqueous electrolyte;
   a second conformal polymer layer disposed on said second electrode, said second conformal polymer layer conductive to said plurality of ions;
   wherein said second electrode with said second conformal polymer layer has a fourth rate of electrochemical loss less than said third rate of electrochemical capacity loss when said second electrode is disposed in said aqueous electrolyte; and
   wherein said first electrode, said second electrode, and said aqueous electrolyte are configured as a rechargeable energy storage cell.

2. The electrochemical apparatus of claim 1 wherein said first conformal polymer layer includes a polypyrrole compound.

3. The electrochemical apparatus of claim 1 wherein said first conformal polymer layer includes a polythiophene compound.

4. The electrochemical apparatus of claim 2 wherein said first Prussian Blue analogue material includes copper hexacyanoferrate.

5. The electrochemical apparatus of claim 3 wherein said first Prussian Blue analogue material includes copper hexacyanomanganate.

6. The electrochemical apparatus of claim 2 wherein said first Prussian Blue analogue material includes manganese hexacyanomanganate.

7. The electrochemical apparatus of claim 3 wherein said first Prussian Blue analogue material includes manganese hexacyanomanganate.

8. The electrochemical apparatus of claim 1 wherein said aqueous electrolyte includes one or more additives selected from the group consisting of an amine or an oxide of an amine, and combinations thereof.

9. The electrochemical apparatus of claim 8 wherein said amine or said oxide of an amine includes pyridine-n-oxide.

10. The electrochemical apparatus of claim 1 wherein said aqueous electrolyte includes a plurality of anion X such that a reaction of said anion X with said first particular cation $P_1$ is configured to form an insoluble compound containing first particular cation $P_1$ and anion X, wherein anion X includes one or more anions selected from the group consisting of fluoride, carbonate, oxalate, or phosphate, and combinations thereof.

11. The electrochemical apparatus of claim 1 wherein said aqueous electrolyte includes one or more additives selected from the group consisting of a simple thiol or a complex thiol group, and combinations thereof.

12. The electrochemical apparatus of claim 11 wherein said simple thiol includes decanethiol.

13. The electrochemical apparatus of claim 11 wherein said complex thiol group includes cysteine.

14. The electrochemical apparatus of claim 1 wherein said first electrode includes a first potential window when disposed in said aqueous electrolyte and wherein said first conformal polymer layer forms a dissolution product in said aqueous electrolyte with said dissolution product chemically inactive within said first potential window.

15. The electrochemical apparatus of claim 1 wherein said first particular cation $P_1$ includes one or more cations selected from the group consisting of a copper cation, a manganese cation, a zinc cation, or an iron cation, and combinations thereof.

16. The electrochemical apparatus of claim 1 wherein said general chemical formula includes:
A is one or more cations selected from the group consisting of $Na^+$, $K^+$, $Li^+$, $NH_4^+$, $Mg2^+$, or $Ca2^+$ and combinations thereof;
P is one or more metal cations selected from the group consisting of $V^{2+}$, $V^{3+}$, $Cr^{2+}$, $Cr^{3+}$, $Mn^{2+}$, $Mn^{3+}$, $Fe^{2+}$, $Fe^{3+}$, $Co^{2+}$, $Co^{3+}$, $Ni^{2+}$, $Cu^+$, $Cu^{2+}$, $Zn^{2+}$, $Al^{3+}$, $Sn^{2+}$, $In^{3+}$, or $Pb^{2+}$ and combinations thereof;
R is one or more transition metal cations selected from the group consisting of $V^{2+}$, $V^{3+}$, $Cr^{2+}$, $Cr^{3+}$, $Mn^{2+}$, $Mn^{3+}$, $Fe^{2+}$, $Fe^{3+}$, $Co^{2+}$, $Co^{3+}$, $Ru^{2+}$, $Ru^{3+}$, $Os^{2+}$, $Os^{3+}$, $Ir^{2+}$, $Ir^{3+}$, $Pt^{2+}$, or $Pt^{3+}$ and combinations thereof; and
L is one or more ligands that may be substituted in the place of a $CN^-$ ligand selected from the group consisting of CO (carbonyl), NO (nitrosyl), or $Cl^-$ and combinations thereof.

* * * * *